(12) United States Patent
Rostykus et al.

(10) Patent No.: US 11,429,525 B2
(45) Date of Patent: Aug. 30, 2022

(54) REDUCING CACHE INTERFERENCE BASED ON FORECASTED PROCESSOR USE

(71) Applicant: NETFLIX, INC., Los Gatos, CA (US)

(72) Inventors: Benoit Rostykus, San Francisco, CA (US); Gabriel Hartmann, San Francisco, CA (US)

(73) Assignee: NETFLIX, INC., Los Gatos, CA (US)

( * ) Notice: Subject to any disclaimer, the term of this patent is extended or adjusted under 35 U.S.C. 154(b) by 146 days.

(21) Appl. No.: 16/510,756

(22) Filed: Jul. 12, 2019

(65) Prior Publication Data

US 2020/0379907 A1 Dec. 3, 2020

Related U.S. Application Data

(60) Provisional application No. 62/855,649, filed on May 31, 2019.

(51) Int. Cl.
*G06F 12/0811* (2016.01)
*G06F 9/38* (2018.01)
(Continued)

(52) U.S. Cl.
CPC ........ *G06F 12/0811* (2013.01); *G06F 9/3851* (2013.01); *G06F 9/505* (2013.01);
(Continued)

(58) Field of Classification Search
CPC .... G06F 12/0811; G06F 9/3851; G06F 9/505; G06F 12/0842; G06F 2209/5019;
(Continued)

(56) References Cited

U.S. PATENT DOCUMENTS 6,615,316 B1 * 9/2003 McKenney ........... G06F 9/5033
711/118
9,268,542 B1 * 2/2016 Mars ..................... G06F 8/4442
(Continued)

OTHER PUBLICATIONS

International Search Report for application No. PCT/US2020/034943 dated Sep. 22, 2020.
(Continued)

*Primary Examiner* — Charles Rones
*Assistant Examiner* — Tong B. Vo
(74) *Attorney, Agent, or Firm* — Artegis Law Group, LLP

(57) ABSTRACT

In various embodiments, a predictive assignment application computes a forecasted amount of processor use for each workload included in a set of workloads using a trained machine-learning model. Based on the forecasted amounts of processor use, the predictive assignment application computes a performance cost estimate associated with an estimated level of cache interference arising from executing the set of workloads on a set of processors. Subsequently, the predictive assignment application determines processor assignment(s) based on the performance cost estimate. At least one processor included in the set of processors is subsequently configured to execute at least a portion of a first workload that is included in the set of workloads based on the processor assignment(s). Advantageously, because the predictive assignment application generates the processor assignment(s) based on the forecasted amounts of processor use, the isolation application can reduce interference in a non-uniform memory access (NUMA) microprocessor instance.

19 Claims, 6 Drawing Sheets

(51) Int. Cl.
   *G06F 9/50* (2006.01)
   *G06F 12/0842* (2016.01)
   *G06N 20/00* (2019.01)
   *G06N 7/00* (2006.01)
(52) U.S. Cl.
   CPC ......... *G06F 12/0842* (2013.01); *G06N 7/005* (2013.01); *G06N 20/00* (2019.01)
(58) Field of Classification Search
   CPC ........... G06F 9/5033; G06F 2212/2542; G06F 2212/1016; G06F 12/084; G06F 9/5016; G06F 9/5044; G06N 20/00; G06N 7/005; G06N 5/003
   See application file for complete search history.

(56) References Cited

U.S. PATENT DOCUMENTS

| | | | |
|---|---|---|---|
| 2011/0231857 A1 | 9/2011 | Zaroo et al. | |
| 2011/0246995 A1* | 10/2011 | Fedorova | G06F 9/5033 718/103 |
| 2012/0233393 A1 | 9/2012 | Jiang et al. | |
| 2013/0185433 A1* | 7/2013 | Zhu | H04L 43/0882 709/226 |
| 2016/0085571 A1 | 3/2016 | Kim et al. | |
| 2017/0344400 A1 | 11/2017 | Birke et al. | |
| 2018/0260330 A1* | 9/2018 | Felter | G06F 9/5016 |
| 2018/0300182 A1* | 10/2018 | Hwang | G06F 9/5077 |
| 2018/0307624 A1* | 10/2018 | Zmora | G06N 3/0445 |
| 2018/0314521 A1 | 11/2018 | Chen et al. | |
| 2018/0341598 A1 | 11/2018 | Patel et al. | |
| 2019/0213130 A1* | 7/2019 | Madugula | G06F 12/0895 |
| 2019/0266015 A1* | 8/2019 | Chandra | G06F 9/5016 |
| 2020/0293445 A1* | 9/2020 | Ibrahim | G06F 12/0811 |
| 2021/0097044 A1* | 4/2021 | Idreos | G06Q 10/103 |

OTHER PUBLICATIONS

Lo et al., "Dynamic Management of TurboMode in Modem Multi-core Chips", IEEE 20th International Symposium on High Performance Computer Architecture (HPCA), IEEE, XP032606779, DOI: 10.1109/HPCA.2014.6835969, Feb. 15, 2014, pp. 603-613.

David Lo, et al., "Heracles: Improving Resource Efficiency at Scale", Stanford University, ISCA '15, Jun. 13-17, 2015, Portland, OR, USA, pp. 1-13 http://csl.stanford.edu/~christos/publications/2015.heracles.isca.pdf.

Jeff Dean, "Maching Learning for Systems and Systems for Machine Learning", Google, pp. 1-54. http://learningsys.org/nips17/assets/slides/dean-nips17.pdf.

* cited by examiner $$C(\underset{382}{M}, X, Y, Z, V, U) = \alpha_{NU} \underset{522}{C_{NU}(X)} + \alpha_{LLC} \underset{532}{C_{LLC}(Y, U)} +$$

$$\alpha_{L1/2} \underset{542}{C_{L1/2}(Z)} + \alpha_O \underset{552}{C_O(M)} + \alpha_R \underset{562}{C_R(V)}$$

Cost Function 442

| NUMA Goal 520 *minimize cross-socket memory accesses* | NUMA Cost 522 $x_{t,j} \in \mathbb{N}^{n \times k}$ | $C_{NU}(X) = -\sum_{j=1}^{k}\sum_{t=1}^{n} x_{t,j} \quad x_{t,j} \leq 1$ $x_{t,j} \leq \frac{1}{r_j} \sum_{i=(t-1)b+1}^{tb+1} m_{i,j}$ |
|---|---|---|
| LLC Goal 530 *balance forecasted processor usages across sockets 220* | LLC Cost 532 $y_t \in \mathbb{N}^n$ | $C_{LLC}(Y, U) = \sum_{t=1}^{k} y_t$ $y_t = \left| U - \sum_{i=(t-1)b+1}^{tb+1} p_j m_{i,j} \right|$ |
| L1/2 Goal 540 *balance forecasted processor usages across cores 230* | L1/2 Cost 542 $z_l \in \mathbb{N}^c$ | $C_{L1/2}(Z) = \sum_{l=0}^{c-1} z_l \quad z_l \geq 0$ $z_l \geq -1 + \sum_{j=1}^{k} p_j m_{2l+1,j} + \sum_{j=1}^{k} p_j m_{2l+2,j}$ |
| Hyper-Thread Goal 550 *maximize hyperthread affinity* | Hyper-Thread Cost 552 $H \in \mathbb{N}^{d \times k}$ | $C_O(M) = \sum_{i=1}^{d} \sum_{j=1}^{k} h_{i,j} m_{i,j}$ $h_{i,j} = i \times j \times \left\lceil \frac{i}{b} \right\rceil$ |
| Reshuffling Goal 560 *minimize reshuffling* | Reshuffling Cost 562 $v_{i,j} \in \mathbb{Z}^{d \times k} \quad m_{i,j} - \tilde{m}_{i,j} \leq v_{i,j}$ | $C_R(V) = \sum_{i=1}^{d} \sum_{j=1}^{k} v_{i,j}$ $-m_{i,j} + \tilde{m}_{i,j} \leq v_{i,j}$ |

FIGURE 5

REDUCING CACHE INTERFERENCE BASED ON FORECASTED PROCESSOR USE

CROSS-REFERENCE TO RELATED APPLICATIONS

This application claims priority benefit of the U.S. Provisional Patent Application titled, "PREDICTIVE CPU ISOLATION OF CONTAINERS," filed on May 31, 2019 and having Ser. No. 62/855,649. The subject matter of this related application is hereby incorporated herein by reference.

BACKGROUND

Field of the Various Embodiments

Embodiments of the present invention relate generally to computer science and microprocessor technology and, more specifically, to techniques for reducing cache interference based on forecasted processor use.

Description of the Related Art

In a typical multiprocessor instance, a process scheduler assigns one or more execution threads to logical processors in order to execute various workloads. Different process schedulers can base these assignments on different criteria and heuristics. For example, the default process scheduler for the Linux kernel is the well-known Completely Fair Scheduler ("CFS"). The CFS implements a variation of a scheduling algorithm known as "weighted fair queuing," where, at a simplified level, the CFS attempts to maintain a weighted fairness when scheduling processing times across different workloads. In so doing, when assigning execution threads to a logical processor, the CFS typically prioritizes the execution thread associated with the workload most "starved" for processing time (according to various workload-specific weights) and assigns that execution thread to the logical processor first.

One drawback of conventional process schedulers, though, is that the performance impact of sharing cache memories (also referred to herein as "caches") in a hierarchical fashion among different groups of logical processors in a non-uniform memory access ("NUMA") multiprocessor instance is not properly considered when assigning execution threads to different logical processors. In particular, in a phenomenon known as "noisy neighbor," when a group of logical processors shares the same cache, the manner in which each logical processor accesses the cache can negatively impact the performance of the other logical processors included in the same group of logical processors. For example, if a thread (also referred to herein as an "execution thread") executing on one logical processor evicts useful data that another thread executing on a second logical processor has stored in a shared cache, then the throughput and/or latency of the second logical processor is typically degraded. Among other things, the evicted data needs to be re-cached for the thread executing on the second logical processor to perform efficient data accesses on that data. As a result of these types of cache interference scenarios, the time required to execute workloads on a NUMA microprocessor instance can be substantially increased. Further, because the time required to execute different workloads can vary based on the amount of cache interference as well as the type of cache interference, the execution predictability of workloads can be decreased, which can lead to preemptive over-provisioning of processors in cloud computing implementations. Over-provisioning can result in some processors or microprocessor instances not being used, which can waste processor resources and prevent adequate processor resources from being allocated to other tasks.

To reduce the negative impacts resulting from the "noisy neighbor" phenomenon, some process schedulers implement heuristics that (re)assign cache memory and/or execution threads in an attempt to avoid cache interference scenarios. For instance, the CFS can perform memory-page migrations and can reassign threads to different logical processors based on heuristics associated with a lowest-level cache ("LLC"). However, these types of heuristic-based mitigation strategies oftentimes do not reduce the performance and execution predictability issues associated with cache interference. For example, empirical results have shown that cache interference can increase the amount of time required to execute a workload on a NUMA microprocessor instance by a factor of three, even when heuristic-based migration strategies are being implemented.

As the foregoing illustrates, what is needed in the art are more effective techniques for executing workloads on logical processors.

SUMMARY

One embodiment of the present invention sets forth a computer-implemented method for executing workloads on processors. The method includes computing a forecasted amount of processor use for each workload included in a set of workloads using a trained machine-learning model; based on the forecasted amounts of processor use, computing a performance cost estimate associated with an estimated level of cache interference arising from executing the set of workloads on a set of processors; and determining at least one processor assignment based on the performance cost estimate, where at least one processor included in the set of processors is subsequently configured to execute at least a portion of a first workload included in the set of workloads based on the at least one processor assignment.

At least one technical advantage of the disclosed techniques relative to the prior art is that, with the disclosed techniques, cache interference in a non-uniform memory access (NUMA) microprocessor instance can be automatically and more reliably reduced. In particular, assigning workloads to processors in a NUMA microprocessor instance based on forecasted processor use can reduce cache interference in the NUMA microprocessor instance in a more systematic, data-driven fashion. Because reducing cache interference improves the latency and/or throughput of a processor, the time required to execute workloads in NUMA microprocessor instances can be substantially decreased. Further, the variances in both latency and throughput are decreased, thereby increasing execution predictability and decreasing preemptive over-provisioning. These technical advantages represent one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive con

FIG. 5 is a more detailed illustration of the cost function of FIG. 4, according to various embodiments of the present invention.

DETAILED DESCRIPTION

Figure 1:
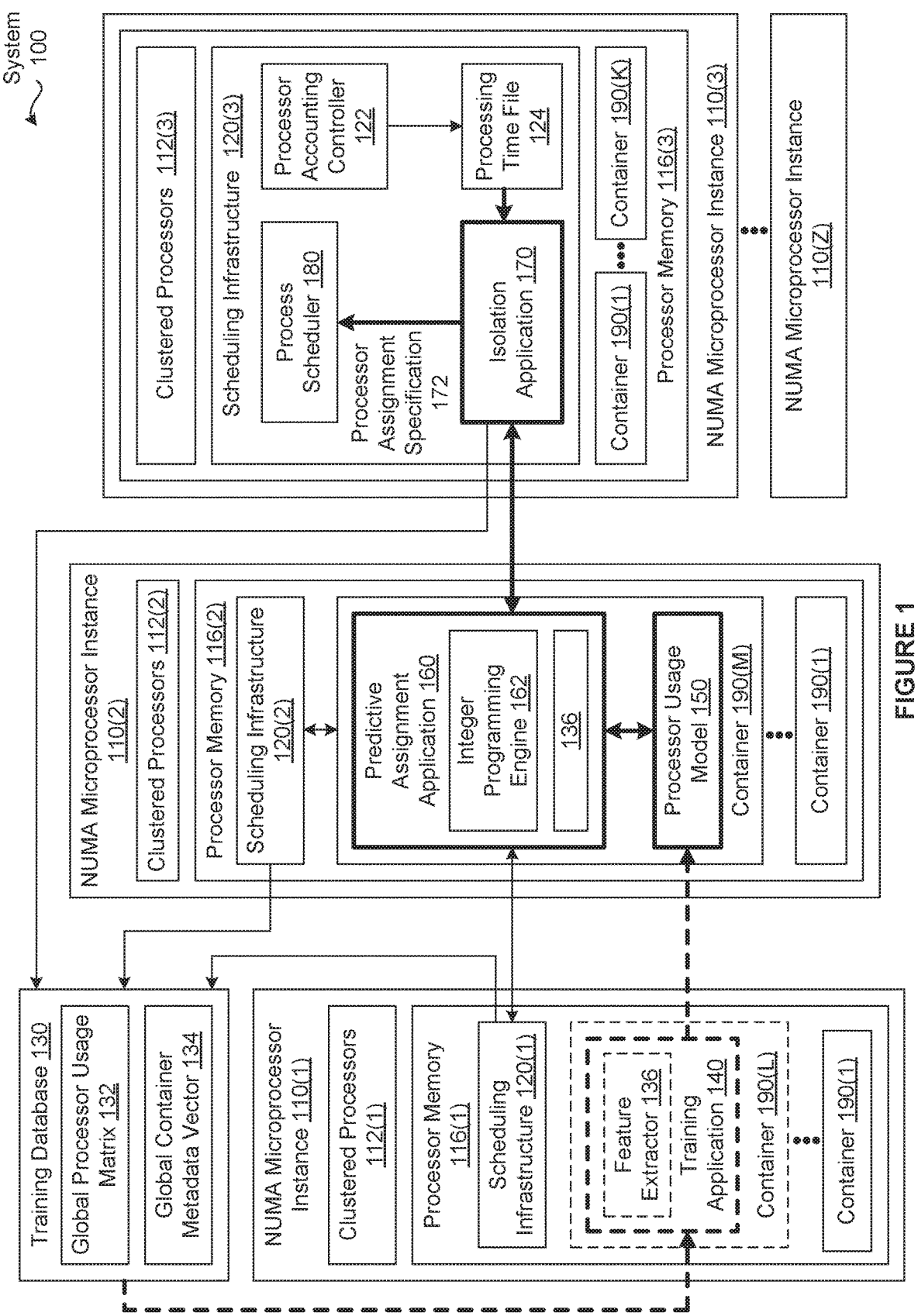
- FIG. 1 is a conceptual illustration of a system configured to implement one or more aspects of the present invention.

In the following description, numerous specific details are set forth to provide a more thorough understanding of the various embodiments. However, it will be apparent to one skilled in the art that the inventive concepts may be practiced without one or more of these specific details.

Oftentimes a service provider executes many diverse applications in a high-throughput fashion using microprocessor instances included in a cloud computing environment (i.e., encapsulated shared resources, software, data, etc.). To ensure the proper execution environment for each application, the applications are organized into groups that are associated with different stand-alone executable instances of code referred to as "containers." Each container provides the required dependencies and can execute any of the included applications. Notably, some containers may include batch applications while other containers may include applications that are intended to interface with users in real-time. When the service provider submits each container for execution, the service provider also specifies the number of logical processors on which to execute the container.

Typically, on each microprocessor instance, a process scheduler assigns one or more execution threads to logical processors in the microprocessor instance in order to execute various workloads, including containers. Different process schedulers can base these assignments on different criteria and heuristics. For example, the default process scheduler for the Linux kernel is the well-known Completely Fair Scheduler (CFS). At a simplified level, the CFS attempts to maintain a weighted fairness when scheduling processing times across different workloads (e.g., tasks, containers, etc.). For example, if four equally-weighted containers that each requested eight processors are executing on a microprocessor instance, then the CFS attempts to provide each container with 25% of the processing time of the microprocessor instance.

Since a typical service provider can run millions of containers in a cloud computing environment each month, effectively utilizing the resources allocated to the service provider within the cloud computing environment is critical. One drawback of typical process schedulers (including the CFS), though, is that the scheduling criteria and heuristics are not properly optimized for non-uniform memory access (NUMA) multiprocessor instances that are often included in cloud computing environments. As a general matter, in a NUMA microprocessor instance, the memory access time varies based on the memory location relative to the logical processor accessing the memory location. In particular, data in use by the logical processors is typically stored in a hierarchy of shared caches, where different levels of the cache are associated with different ranges of access times. For example, some NUMA multiprocessor instances include thirty-two cores that can each execute two hyper-threads via two logical processors. The two logical processors included in each core share a level 1 ("L1") cache and a level 2 ("L2") cache, and the thirty-two cores share a lowest-level cache (LLC). Consequently, each logical processor shares an L1 cache and an L2 cache with another logical processor and shares an LLC with sixty-three other logical processors.

In a phenomenon known as "noisy neighbor," when a group of logical processors shares the same cache, the manner in which each logical processor accesses the cache can negatively impact the performance of the other logical processors included in the same group of logical processors. For example, if a thread executing on one logical processor evicts useful data that another thread executing on a second logical processor has stored in a shared cache, then the throughput and/or latency of the second logical processor is typically degraded. Among other things, the evicted data needs to be re-cached for the thread executing on the second logical processor to perform efficient data accesses on that data. As a result of these types of cache interference scenarios, the time required to execute workloads on a NUMA microprocessor instance can be substantially increased. For example, empirical results have shown that cache interference can increase the amount of time required to execute a workload on a NUMA microprocessor instance by a factor of three.

Further, because the time required to execute different workloads can vary based on the amount of cache interference as well as the type of cache interference, the execution predictability of workloads can be decreased. If an application is particularly time-sensitive, such as an application that interfaces with users in real-time, then the service provider may allocate more processors than necessary to ensure an acceptable response time based on the worst-case performance. Such "over-provisioning" can result in some processors or microprocessor instances not being used, which can waste processor resources and prevent adequate processor resources from being allocated to other tasks.

With the disclosed techniques, however, an isolation application executing on a NUMA microprocessor instance can over-ride the default scheduling behavior of the process scheduler to reduce cache interference. In one embodiment, the isolation application transmits an assignment request to a predictive assignment application. For each container associated with the NUMA microprocessor instance, the predictive assignment application computes a forecasted processor usage based on a processor usage model, container metadata (e.g., attributes of the container), and a times series of measured processor usages. Processor usage is also referred to herein as "processor use." The processor usage model is a machine learning model that is trained using historical container and processor usage data for any number of containers associated with any number of NUMA microprocessor instances. The forecasted processor usage of a container predicts a future processor usage statistic (e.g., average) for the container over a particular time window.

An integer programming engine then executes one or more integer programming algorithms based on the forecasted processor usages to generate a set of processor assignments designed to reduce cache interference. More precisely, in a technique similar to optimizing the assignment of airplanes to routes, the integer programming algorithms perform optimization operations on a set of processor assignments to minimize a cost function that estimates the performance costs associated with cache interference based on the forecasted processor usages. The isolation application then configures the process scheduler to assign each of the containers to the requested number of logical processors in the NUMA microprocessor instance based on the set of processor assignments.

At least one technical advantage of the disclosed techniques relative to the prior art is that the predictive assignment application can automatically and more reliably reduce cache interference associated with co-located threads (i.e., threads sharing at least one cache) in a NUMA microprocessor instance. Because reducing cache interference improves the latency and/or throughput of a processor, the time required to execute containers in NUMA microprocessor instances can be substantially decreased. Further, the variances in both latency and throughput are decreased, thereby increasing execution predictability and decreasing preemptive over-provisioning. As a result, the overall amount of resources requested by containers can be reduced. These technical advantages represent one or more technological advancements over prior art approaches.

System Overview

FIG. 1 is a conceptual illustration of a system 100 configured to implement one or more aspects of the present invention. As shown, the system 100 includes, without limitation, any number of non-uniform memory access (NUMA) microprocessor instances. For explanatory purposes, multiple instances of like objects are denoted with reference numbers identifying the object and parenthetical numbers identifying the instance where needed. In some embodiments, any number of the NUMA microprocessor instances 110 may be distributed across multiple geographic locations or included in one or more cloud computing environments (i.e., encapsulated shared resources, software, data, etc.) in any combination.

Each of the NUMA microprocessor instances 110 may be any type of physical system, virtual system, server, chip, etc., that includes multiple processors linked via a NUMA memory design architecture. As shown, each of the NUMA microprocessor instances 110 includes, without limitation, clustered processors 112 and processor memory 116. The clustered processors 112 include, without limitation, any number of logical processors (not shown in FIG. 1) arranged in any technically feasible fashion. Each logical processor is capable of executing a different thread of execution. The term "thread" as used herein refers to any type of thread of execution, including a hyper-thread. The processor memory 116($x$) includes any number of blocks of physical memory (e.g., caches) that store content, such as software applications and data, for use by the clustered processors 112($x$) of the NUMA microprocessor instance 110($x$).

In each of the NUMA microprocessor instances 110, the memory access time varies based on the memory location relative to the logical processor accessing the memory location. In particular, data in use by the logical processors is typically stored in a hierarchy of shared caches, where different levels of the cache are associated with different ranges of access times and are shared between different groups of logical processors.

Figure 2:
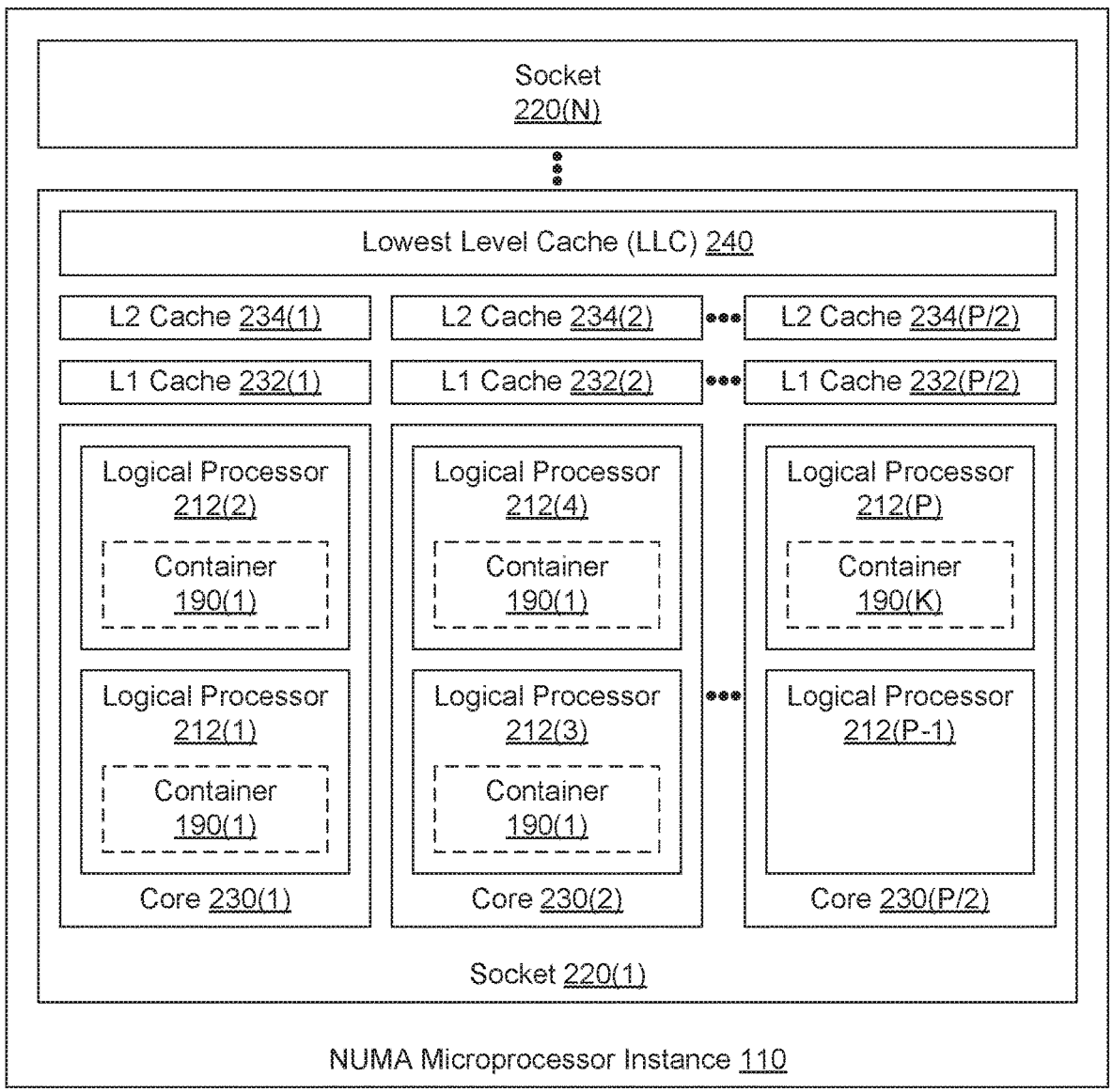
FIG. 2 is a more detailed illustration of one of the non-uniform memory access ("NUMA") microprocessor instances of FIG. 1, according to various embodiments of the present invention.

FIG. 2 illustrates the organization of logical processors and shared caches within one of the NUMA multiprocessors 110, according to various embodiments.

In general, each of the NUMA microprocessor instances 110 may include any number and type of logical processors and any amount and type of memory structured in any technically feasible fashion that is consistent with a NUMA architecture. In various embodiments, the number of logical processors and/or amount of memory included in the NUMA microprocessor instance 110($x$) may vary from the number of logical processors and/or amount of memory included in the NUMA microprocessor instance 110($y$). In the same or other embodiments, the hierarchy of shared caches within the NUMA microprocessor instance 110($x$) may vary from the hierarchy of shared caches within the NUMA microprocessor instance 110($y$).

At any given point in time, each NUMA microprocessor instance 110($x$) is configured to execute a different set of workloads. As referred to herein, a "workload" is a set of executable instructions that represents a discrete portion of work. Examples of workloads include, without limitation, a thread, a task, a process, containers 190, etc. To execute a workload, a process scheduler 180($x$) executing on the NUMA microprocessor instance 110($x$) assigns threads to one or more of the logical processors included in the clustered processors 112($x$). As a general matter, different process schedulers can base these assignments on different criteria and heuristics. The processor scheduler 180($x$) is a software application that, at any given point in time, may be stored in any block of physical memory included in the processor memory 116($x$) and may execute on any of the logical processors included in the clustered processors 112($x$). The process scheduler 180($x$) may perform scheduling and assignment operations at any level of granularity (e.g., thread, task, process, the container 190) in any technically feasible fashion.

One drawback of conventional process schedulers is that the performance impact of sharing caches in a hierarchical fashion among different groups of the logical processors in the associated NUMA multiprocessor instance 110 is not properly considered when assigning threads to the relevant logical processors. In a phenomenon known as "noisy neighbor," when a group of the logical processors shares the same cache, the manner in which each of the logical processors accesses the cache can negatively impact the performance of the other logical processors in the same group of logical processors.

For example, if a thread executing on one logical processor evicts useful data that another thread executing on a second logical processor has stored in a shared cache, then the throughput and/or latency of the second logical processor is typically degraded. Among other things, the evicted data needs to be re-cached for the thread executing on the second logical processor to perform efficient data accesses on that data. As a result of these types of cache interference scenarios, the time required to execute workloads on each of the NUMA multiprocessor instances 110 can be substantially increased. Further, because the time required to execute different workloads can vary based on the amount of cache interference as well as the type of cache interference, the execution predictability of workloads can be decreased, which can lead to preemptive over-provisioning of processors in cloud computing implementations.

Optimizing Processor Assignments

To reliably reduce cache interference, each of the NUMA microprocessor instances 110 includes, without limitation, a different instance of an isolation application 170. The isolation application 170(x) interacts with a predictive assignment application 160 to determine and subsequently implement optimized processor assignments that reduce cache interfere within the NUMA microprocessor instance 110(x). As referred to herein, a "processor assignment" is an assignment of a workload at any granularity for execution by one or more of the logical processors. With respect to processor assignment, the term "assignment" is symmetrical. Consequently, a processor assignment between the container 190 (y) and a particular logical processor can be referred to as either "assigning the container 190(y) to the logical processor" or "assigning the logical processor to the container 190(y)."

Note that the techniques described herein are illustrative rather than restrictive, and may be altered without departing from the broader spirit and scope of the invention. Many modifications and variations will be apparent to those of ordinary skill in the art without departing from the scope and spirit of the described embodiments and techniques. Further, in various embodiments, any number of the techniques disclosed herein may be implemented while other techniques may be omitted in any technically feasible fashion.

In particular and for explanatory purposes, the functionality of each of the isolation application 170, the predictive assignment application 160 and a training application 140 is described herein in the context of the containers 190. Each of the containers 190 is associated with a stand-alone executable instance of code that provides an independent package of software including, without limitation, any number of applications and the associated dependencies. Accordingly, each of the containers 190 may execute any number (including one) of tasks via any number (including one) of threads.

However, as persons skilled in the art will recognize, the techniques described herein are applicable to optimizing processor assignments at any level of granularity. In alternate embodiments, the isolation application 170 may assign any type of workload to any type of processors and the techniques described herein may be modified accordingly. For instance, in some embodiments, the isolation application 170 assigns different threads to different central processing units ("CPUs") included in the associated microprocessor instance 110(x), where each CPU implements two logical processors via hyper-threading.

As shown, the isolation application 170(x) is included in a scheduling infrastructure 120(x) that also includes, without limitation, a processor accounting controller 122(x), a processing time file 124(x), and the process scheduler 180(x). Each of the isolation application 170(x), the processing accounting controller 122(x), and the process scheduler 180(x) are a software application that, at any given point in time, may be stored in any portion of the processor memory 116(x) and may execute on any of the clustered processors 112(x).

The isolation application 170(x) configures the processor accounting controller 122(x) to track the accumulated processing time for each of the logical containers 190 executing on the NUMA microprocessor instance 110(x). The processing time file 124(x) is a kernel data structure that, when accessed, triggers the processor accounting controller 122(x) to provide up-to-date accumulated processing times for the containers 190 executing on the NUMA microprocessor instance 110(x). The accumulated processing time of the container 190(y) is the aggregate processing time (in nanoseconds) consumed by the logical processor(s) executing thread(s) associated with the container 190(y).

The processor accounting controller 122 and the processing time file 124 may be implemented in any technically feasible fashion. For instance, in some embodiments, the isolation applications 170 defines a different control group ("cgroup") for each of the containers 190, and the processor accounting controller 122(x) is a CPU accounting controller that is a component of the Linux kernel. A cgroup is a Linux feature that limits, accounts for, and isolates the resource usage (e.g., CPU, memory, disk I/O, network, etc.) of a collection of one or more processes. The CPU accounting controller provides the aggregated processing time for each cgroup. In alternate embodiments, the processor accounting controller 122(x) and the processing time file 124(x) may be replaced with any elements that track activities of processors and/or any type of workload at any granularity in any technically feasible fashion.

In operation, the isolation application 170(x) implements a usage update process, a training database update process, and a processor assignment process.asynchronously to one another. The isolation application 170(x) implements the usage update process at intervals of a usage update delta (e.g., 1 minute). The isolation application 170(x) may acquire the usage update delta in any technically feasible fashion. For instance, in some embodiments, the isolation application 170(x) acquires the usage update delta via a container management subsystem (not shown in FIG. 1). For explanatory purposes only, if the usage update process u occurs at a time of t, then the usage update process (u+1) occurs at a time of (t+usage update delta).

To implement the usage update process u at time t, the isolation application 170(x) accesses the processing time file 124 to obtain the current processing time for each of the containers 190 executing on the NUMA microprocessor instance 110(x). For each of the containers 190, the isolation application 170(x) then subtracts the processing time obtained during the usage update process (u−1) from the current processing time to determine a delta processing time. Subsequently, the isolation application 170(x) normalizes each of the delta processing times with respect to the total number of logical processors included in the clustered processors 112(x) to determine processor usages associated with the time t in units of "logical processors." Processor usage is also referred to herein as "processor use."

For each of the containers 190(y), the isolation application 170(x) appends the processor usage to a processor usage time series that is stored in the $y^{th}$ row of a processor usage matrix (not shown in FIG. 1). According, each row in the processor usage matrix is associated with a different container 190 and each column is associated with a different time. In alternate embodiments, the isolation application 170(x) may acquire and store processor usages in any technically feasible fashion.

The isolation application 170(x) implements the training database update process at intervals of a training database update delta (e.g., 10 minutes). The isolation application 170(x) may acquire the training database update delta in any technically feasible fashion. For instance, in some embodiments, the isolation application 170(x) acquires the training database update delta via a container management subsystem. To implement the training database update process, the isolation application 170(x) updates a training database 130 based on the process usage matrix and a container metadata vector (not shown in FIG. 1). The container metadata vector includes, without limitation, container metadata for each of the different containers 190 associated with the NUMA microprocessor instance 110(x). As referred to herein, if the container 190 is executing or initiating execution on the NUMA microprocessor instance 110(x), then the container 190 is "associated with" the NUMA microprocessor instance 110(x).

The container metadata for the container 190(y) may include any amount and type of information that is associated with the container 190(y) and the execution of the container 190(y). For example, the container metadata for the container 190(y) could include a user identifier indicating a user that launched the container 190(y), a Boolean indicating whether Java is installed in the container 190(y), the resources requested when the container 190(y) was launched (e.g., number of logical processors, amount of network resources, amount of the processor memory 116, amount of disk, etc.), an application name, and so forth. The isolation application 170(x) may acquire the container metadata in any technically feasible fashion. For instance, in various embodiments, the isolation application 170(x) acquires the container metadata that is the $y^{th}$ entry in the container metadata vector during a container initiation event that initiates the execution of the container 190(y) on the NUMA microprocessor instance 110(x).

As shown, the training database 130 includes, without limitation, a global processor usage matrix 132 and a global container metadata vector 134. The global processor usage matrix 132 is an aggregation of the different processor usage matrices associated with the different NUMA multiprocessor instances 110. In particular, the global processor usage matrix 132 includes, without limitation, a processor usage time series for each of any number of the containers 190 associated with or previously associated with the NUMA microprocessor instances 110. Each row in the global processor usage matrix 132 is associated with a different container 190 and each column in the global processor usage matrix 132 is associated with a different time. Similarly, the global container metadata vector 134 is an aggregation of the different container metadata vectors associated with the different NUMA microprocessor instances 110. Each element in the global container metadata vector 134 contains container metadata for a different container 190.

The isolation application 170(x) may update the training database 130 in any technically feasible fashion. For instance, in some embodiments, the isolation application 170(x) transmits the processor usage matrix and the container metadata vector to a training database management application (not shown). For each new container 190, the training database management application adds the container metadata as a new entry in the global container metadata vector 134. The training database management application also adds the processor usage time series for the new container 190 (included in the processor usage matrix) to the global processor usage matrix 132. For each existing container 190, the training database management application appends new data from the processor usage time series included in the processor usage matrix to the corresponding processor usage time series included in the global processor usage matrix 132. In alternate embodiments, the isolation application 170(x) directly updates the training database 130 to reflect data acquired since executing the previous training database update process.

As depicted via dashed lines, a training application 140 generates a processor usage model 150 based on the training database 130. For explanatory purposes only, the training application 140 is depicted within the container 190(L) associated with the NUMA microprocessor instance 110(1). At any given point in time, the training application 140 may be stored in any portion of the processor memory 116(1) and may execute on any of the clustered processors 112(1). In alternate embodiments, any portion (including all) of the training application 140 may execute outside any container 190 and/or on any device capable of executing instructions.

For each combination of one of the containers 190 represented in the training database 130 and one of any number of prediction times, the training application 140 configures a feature extractor 136 to generate a different feature set (not shown in FIG. 1). For example, if the training database 130 represented 100,342 containers 190 and the total number of prediction times was 80, then the feature extractor 136 would execute 8,027,360 times and generates 8,027,360 feature sets.

Each feature set includes, without limitation, any number of time series features and any number of contextual features. Each of the contextual features corresponds to the associated container 190 or the launch of the associated container 190 and is derived from the associated container metadata. By contrast, each of the temporal features corresponds to the processor usages of the associated container 190 or time-related attribute(s) of the associated container 190. Examples of time series features could include, without limitation, the average processor usage in the last minute, the median processor usage from (the prediction time—20 minutes) to the prediction time, the median processor usage from (the prediction time—10 minutes) to the prediction time, the current hour of the day, the current day of the week, etc.

The prediction time is the end time of a historical time window that has a duration equal to a historical window duration, and a start time of (the prediction time—the historical window duration). For example, suppose that the historical window duration was 60 minutes, a first feature set was associated with the container 190(1) and a prediction time of 60 minutes, and a second feature set was associated with the container 190(1) and a prediction time of 120 minutes. The first feature set would include features derived from the container metadata associated with the container 190(1) and the portion of the processor usage time series associated with the container 190(1) from 0 to 60 minutes. By contrast, the second feature set would include features derived from the container metadata associated with the container 190(1) and the portion of the processor usage time series associated with the container 190(1) from 60 to 120 minutes.

For each feature set, the training application 140 also computes the ground truth label used to train the processor usage model 150 to compute a forecasted processor usage of the associated container 190 relative to the associated prediction time. The training application 140 may define the forecasted processor usage and compute the ground truth labels in any technically feasible fashion that is consistent with the processor usage model 150 and the training database 130.

For instance, in some embodiments, the processor usage model 150 is a Gradient Boosted Regression Tree ("GBRT") conditional regression model and the training application 140 defines the forecasted processor usage as the P95 processor usage in the ten minutes following the prediction time. As persons skilled in the art will recognize, the forecasted processor usage is therefore the value for which the probability that the actual processor usage in the next ten minutes reaches (or exceeds) the value is 5%. For example, if the forecasted processor usage is 4 logical processors, then the probability that the actual processor usage in the next ten minutes reaches (or exceeds) 4 logical processors is 5%.

To compute the ground truth labels, the training application 140 may implement any technically feasible algorithm that is consistent with the processor usage delta that defines the granularity of each processor usage time series. For instance, in some embodiments, the training application 140 sets each ground truth label equal to a random value of minute-average processor usage in the next 10 minutes. If the processor usage delta is 1 minute, then the training application 140 sets the ground-truth label for a feature set associated with the container 190(y) and a prediction time t to one of the ten processor usages from the time (t+1) to the time (t+10) in the processor usage time series associated with the container 190(y).

In alternate embodiments, the training application 140 may define the forecasted processor usage as a statistical level of confidence (i.e., Pxx) based on any quantile (e.g., 50 instead of 95) and any length of time (e.g., 15 minutes instead of 10 minutes) following the prediction time. In other alternate embodiments, the training application 140 may execute any number and type of machine learning operations to train any type of processor usage model 150 that predicts any type of statistic or characteristic associated with processor usages for any type of workload at any future time or over any future time window. Notably, the forecasted processor usage may be defined based on the intended application of the forecasted processor usages and/or characteristics of the processor usages. For instance, defining the forecasted processor usage as an average instead of an upper-quantile would result in a usage prediction model 150 that was less conservative with respect to data heterogeneity.

The training application 140 may perform any number and type of machine learning operations to generate the processor usage model 150 based on the feature sets and the associated ground truth labels. For instance, in some embodiments, the training application 140 may execute any number and type of statistical algorithms for learning and regression to generate a trained conditional regression model or a trained conditional quantile regression model (e.g., a GBRT conditional regression model) that is the processor usage model 150. After generating the processor usage model 150, the training application 140 transmits the processor usage model 150 to the predictive assignment application 160.

At intervals of a training delta (e.g., 3 hours), the training application 140 re-generates the processor usage model 150 based on the training database 130. The training application 140 may acquire the training delta in any technically feasible fashion. For instance, in some embodiments, the training application 140 acquires the training delta via a container management subsystem. Because each of the isolation applications 170 periodically updates the training database 130, periodically re-training the processor usage model 150 ensures that the processor usage model 150 reflects current conditions in the system 100. The training application 140 then transmits the updated processor usage model 150 to the predictive assignment application 160.

Figure 3:
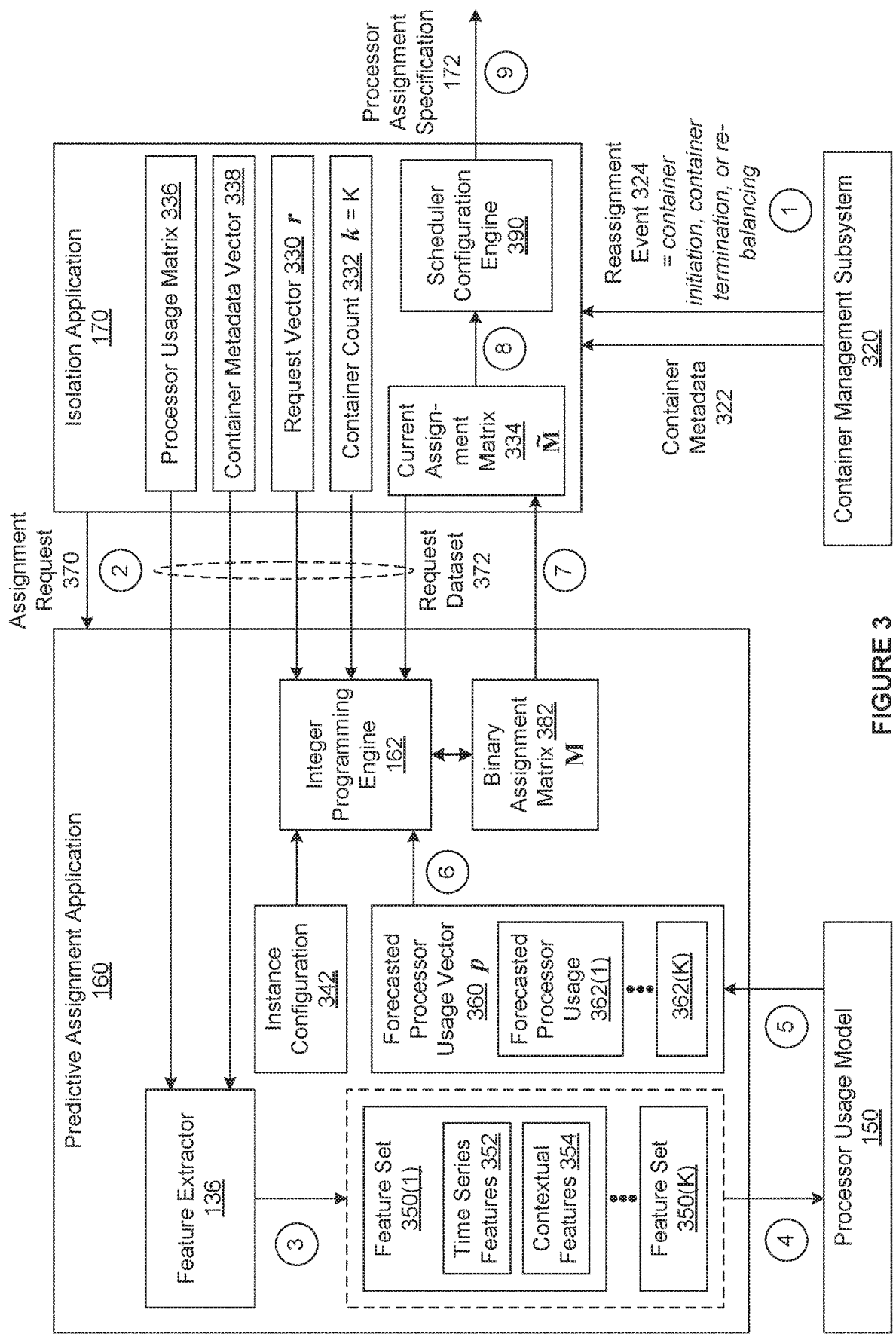
FIG. 3 is a more detailed illustration of the predictive assignment application of FIG. 1, according to various embodiments of the present invention.
Figure 4:
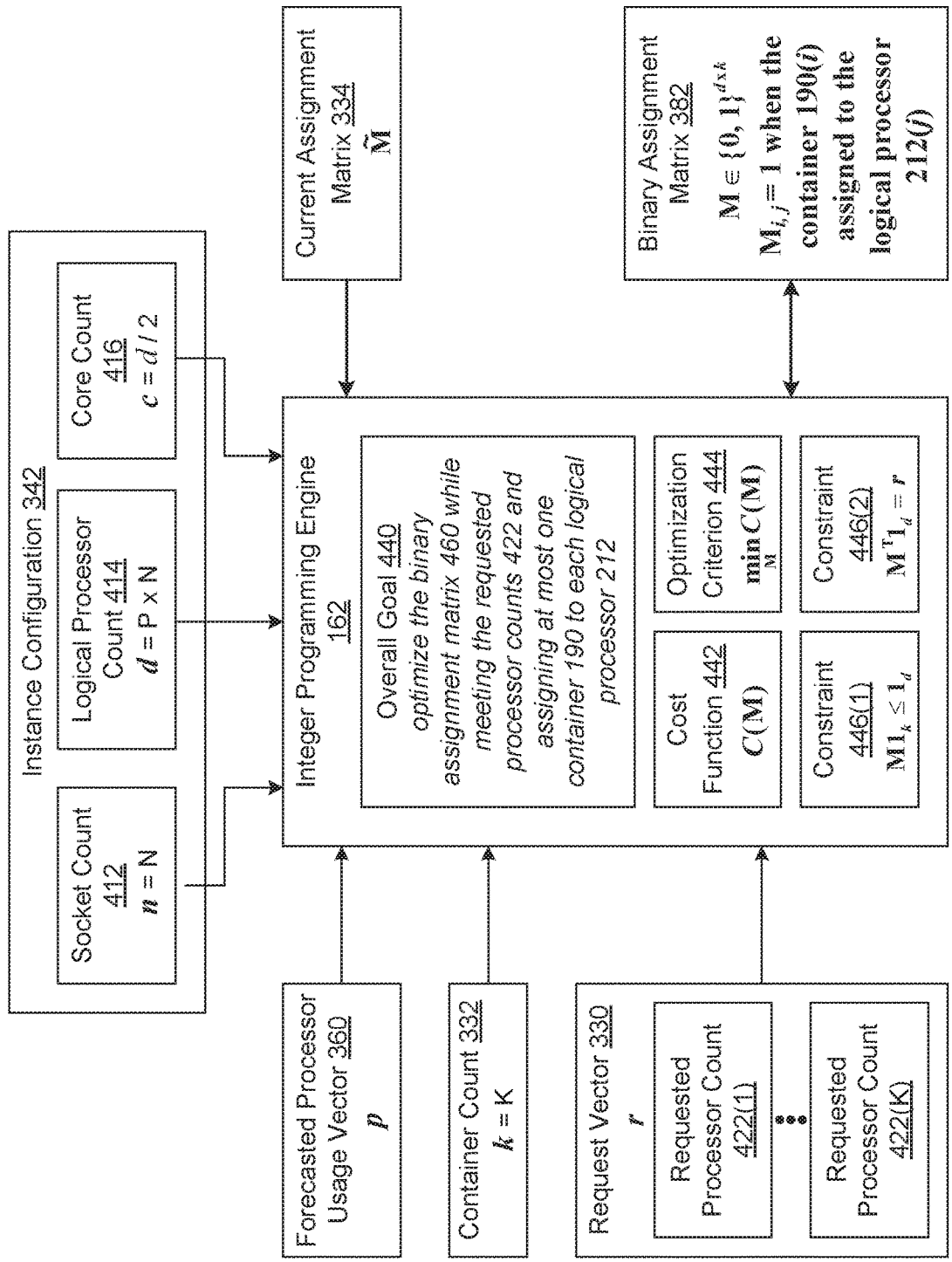
FIG. 4 is a more detailed illustration of the integer programming engine of FIG. 3, according to various embodiments of the present invention.

As described in greater detail in conjunction with FIGS. 3 and 4, the isolation application 170(x) executes the processor assignment process. in response to each reassignment event associated with the NUMA microprocessor instance 110(x). A reassignment event is a container initiation event, a container termination event, or a re-balancing event. A container initiation event is associated with a container request that solicits a specified number of logical processors to execute a new container 190(y) within the NUMA microprocessor instance 110(x). By contrast, a container termination event is associated with the termination of the container 190(z) that was previously executing within the NUMA microprocessor instance 110(x). A re-balancing event is an on-demand trigger for a new processor assignment process that reflects any changes in the processor usages of the containers 190 since the last processor assignment process.

The isolation application 170(x) may acquire the reassignment events in any technically feasible fashion. Further, in some embodiments, the isolation application 170(x) or a container management subsystem may generate a re-balancing event to trigger a processor assignment process when the time elapsed since the last execution of the processor assignment process exceeds a maximum reassignment delta.

To initiate a processor assignment process, the isolation application 170(x) updates a request dataset (not shown in FIG. 1), generates an assignment request specifying the request dataset, and transmits the assignment request to the predictive assignment application 160. The request dataset includes information describing the containers 190 associated with the NUMA microprocessor instance 110(x), such as the processor usage matrix and the container metadata vector. In response to the assignment request, the predictive assignment application 160 generates a current assignment matrix (not shown in FIG. 1) that specifies optimized processor assignments for the containers associated with the NUMA microprocessor instance 110(x).

For explanatory purposes only, the predictive assignment application 160 and the processor usage model 150 are depicted within the container 190(M) associated with the NUMA microprocessor instance 110(2). At any given point in time, each of the predictive training assignment application 160 and the processor usage model 150 may be stored in any portion of the processor memory 116(2) and may execute on any of the clustered processors 112(2). Advantageously, because the isolation application 170(2) generates optimized processor assignments for the NUMA microprocessor instance 110(2), the predictive assignment application 160 optimizes the logical processor assignments associated with the container 190(M). The predictive assignment application 160 can therefore self-isolate from other software applications executing in other containers 190. In alternate embodiments, any portion (including all) of the predictive assignment application 160 and/or the processor usage model 150 may execute outside any container 190 and/or on any device capable of executing instructions.

As shown, the predictive assignment application 160 includes, without limitation, the feature extractor 136 and an integer programming engine 162. For each of the containers 190 associated with the NUMA microprocessor instance 110(x)t, the predictive assignment application 160 configures the feature extractor 136 to generate a different feature set based the associated container metadata, the associated processor usage time series, and a prediction time equal to the current time. Subsequently, for each container 190(y), the predictive assignment application 160 provides the associated feature set as an input to the processor usage model 150 and stores the resulting output of the processor usage model 150 as the forecasted processor usage of the container 190(y).

The predictive assignment application 160 then configures the integer programming engine 162 to generate the current assignment matrix based on the forecasted processor usages and configuration data associated with the NUMA microprocessor instance 110 and the associated containers 190. The integer programming engine 162 executes one more integer programming algorithms to optimize a binary assignment matrix based on the forecasted processor usages and a cost function that estimates a performance cost associated with cache interference. In particular, the cost function includes terms associated with goals of balancing the predicted pressures across each of the different levels of caches included in the NUMA microprocessor instance 110 based on the forecasted processor usages. For each of the containers 190 associated with the NUMA microprocessor instance 110, the binary assignment matrix specifies at least one processor assignment. The predictive assignment application 160 transmits the binary assignment matrix as the current assignment matrix to the isolation application 170 that issued the assignment request.

As shown, the isolation application 170 generates a processor assignment specification 172 based on the current assignment matrix and then transmits the processor assignment specification 172 to the process scheduler 180. The processor assignment specification 172 configures the process scheduler 180 to assign the containers 190 to the logical processors as per the current assignment matrix. The processor assignment specification 172 may configure the process scheduler 180 in any technically feasible fashion.

It will be appreciated that the system 100 shown herein is illustrative and that variations and modifications are possible. For example, the functionality provided by the predictive assignment application 160, the integer programming engine 162, the feature extractor 136, the isolation application 170 and the process scheduler 180 as described herein may be integrated into or distributed across any number of software applications (including one) and any number of components of the computer system 100. For instance, in some embodiments, the predictive assignment application 160 may reside and/or execute externally to the NUMA microprocessor instance 110. In various embodiments, the process scheduler 180 may be omitted from the NUMA microprocessor instance 110, and the isolation application 170 may include the functionality of the process scheduler 180. Further, the connection topology between the various units in FIG. 1 may be modified as desired.

FIG. 2 is a more detailed illustration of one of the non-uniform memory access (NUMA) microprocessor instances 110 of FIG. 1, according to various embodiments of the present invention. As shown, the NUMA microprocessor instance 110 includes, without limitation, any number of sockets 220, where each of the sockets 220 is a different physical block of processors and memory.

Each of the sockets 220 includes, without limitation, a lowest-level cache (LLC) 240 and any number of cores 230, level one (L1) caches 232, and level two (L2) caches 234. Each of the cores 230 includes, without limitation, two logical processors 212. Each of the cores 230 may be any instruction execution system, apparatus, or device capable of executing instructions and having hyper-threading capabilities. For example, each of the cores 230 could comprise a different central processing unit (CPU) having hyper-threading capabilities. Each of the logical processors 212 included in the core 230 is a virtual processing core that is capable of executing a different hyper-thread. In alternate embodiments, each of the cores 230 may include any number (including one) of the logical processors 212. In some embodiments, the cores 230 do not have hyper-threading capabilities and therefore each of the cores 230 is also a single logical processor 212.

The total number of the sockets 220 included in the NUMA microprocessor instance 110 is N, where N is any positive integer. Within each of the sockets 220, the total number of each of the cores 230, the L1 caches 232, and the L2 caches 234 is P/2, where P is any positive integer, and the total number of the logical processors 212 is P. Consequently, within the NUMA microprocessor instance 110, the total number of the LLCs 240 is N; the total number of each of the cores 230, the L1 caches 232, and the L2 caches 234 is (N*P/2); and the total number of the logical processors 212 is (N*P). Referring to FIG. 1, the clustered processors 112 of the microprocessor instance 110 includes (N*P) logical processors 212 organized into (N*P/2) cores 230. The processor memory 116 of the microprocessor instance 110 includes N LLCs 240, (N*P/2) L1 caches, and (N*P/2) L2 caches 234.

Each of the caches is a different block of memory, where the cache level (e.g., L1, L2, lowest-level) indicates the proximity to the associated cores 230. In operation, each of the caches is shared between multiple logical processors 212 in a hierarchical fashion. As shown, the LLC 240 included in the socket 220(g) is shared between the P logical processors 212 included in the socket 220(g). The L1 cache 232(h) and the L2 cache 234(h) are associated with the core 230(h) and are shared between the two logical processors 212 included in the core 230(h). Consequently, each of the logical processors 212 shares one of the L1 caches 232 and one of the L2 caches 234 with another logical processor 212 and shares one of the LLCs 240 with (P−1) other logical processors 212.

For explanatory purposes only, the logical processors 212(1)-(4) and 212(P) are annotated with dotted boxes depicting the assigned containers 190 as per the container assignment 172. As shown, the container 212(1) is assigned to the logical processors 121(1-4), and the container 190(K) is assigned to the logical processor 212(P). Accordingly, the LLC cache 240 is shared by at least four threads associated with the container 190(1) and one thread associated with the container 190(K). Further, the L1 cache 232(1) and the L2 cache 234(1) are shared between two threads associated with the container 190(1). Similarly, the L1 cache 232(2) and the L2 cache 234(2) are shared between two threads associated with the container 190(1). By contrast, the L1 cache 232(P/2) and the L2 cache 234(P/2) are used by a single thread associated with the container 190(K).

Assigning Processors Based on Forecasted Use

FIG. 3 is a more detailed illustration of the predictive assignment application 160 of FIG. 1, according to various embodiments of the present invention. For explanatory purposes, FIG. 3 describes the predictive assignment application 160 in the context of a processor assignment process that generates the processor assignment specification 172 for the NUMA microprocessor instance 110 of FIG. 2. FIG. 3 depicts the processor assignment process as a series of numbered bubbles.

As depicted with a bubble number 1, a container management subsystem 320 transmits a reassignment event 324 and container metadata 322 to the isolation application 170. The container management subsystem 320 may perform any number and type of activities related to generating and executing the containers 190 on any number and type of microprocessor systems, including any number of the NUMA microprocessor instances 110. The reassignment event 324 may be a container initiation event, a container termination event, or a re-allocation event.

A container initiation event is associated with a container request (not shown) to execute a new container 190 within the NUMA microprocessor instance 110. The container request is associated with the container metadata 322 that specifies attributes of the new container 190 and/or the initiation of the new container 190. In particular, the container metadata 322 specifies the number of logical processors 212 that the container request solicits for execution of the new container 190. A container termination event is associated with the termination of the container 190 that was previously executing within the NUMA microprocessor instance 110. A re-balancing event is an on-demand trigger for a new processor assignment process that reflects any changes in the processor usages of the containers 190 since the last processor assignment process.

As shown, the isolation application 170 includes, without limitation, a container count 332, a request vector 330, a container metadata vector 338, a processor usage matrix 336, a current assignment matrix 334, and a scheduler reconfiguration engine 390. The container count 332 is equal to the total number of the containers 190 associated with the NUMA microprocessor instance 110. With reference to FIG. 2, the container count 332 is K (assuming that none of the containers 190(1)-190(K) have terminated). As depicted in FIG. 3, the container count 332 is symbolized as a variable "k".

For each of the containers 190 associated with the NUMA microprocessor instance 110 executing the isolation application 170, the request vector 330 specifies the requested processor count of the associated container request. The request vector 330 is symbolized as "r". The request vector 330 is assumed to have at least one feasible solution, expressed as the following equation (1), where d is the total number of logical processors 112 in the NUMA microprocessor instance 110:

$$\Sigma_i r_i \leq d \quad r \in N^* \qquad (1)$$

Prior to receiving the first container initiation event, the isolation application 170 sets the container count 332 equal to zero and sets the request vector 330 equal to NULL. Upon receiving a container initiation event, the isolation application 170 increments the container count 330 and adds the requested processor count of the associated container request to the request vector 330. For explanatory purposes, the requested processor count associated with the container 190(x) is the xth element "$r_x$" of the request vector 330. In a complementary fashion, upon receiving a container termination event, the isolation application 170 decrements the container count 332 and removes the associated requested processor count from the request vector 330.

The container metadata vector 338 contains a different entry for each of the containers 190 associated with the NUMA microprocessor instance 110. If the NUMA microprocessor instance 110 is associated with K containers 190, then the container metadata vector 338 includes K entries. Each of the entries in the container metadata vector 338 specifies any amount of the container metadata 322 and any amount of data derived from the container metadata 322 for the associated container 190. Upon receiving a container initiation event, the isolation application 170 generates a new entry in the container metadata vector 338 based on the associated container metadata 322.

The processor usage matrix 336 includes processor usages for the containers 190 that are currently executing or have previously executed on the NUMA multiprocessor instance 110. As previously described in conjunction with FIG. 1, the isolation application 170 periodically generates the processor usages based on processing times acquired via the processing time file 124. Each row in the processor usage matrix 336 corresponds to a processor usage time series for a different container 190 and each column corresponds to a different time. In some embodiments, the processor usage matrix 336 may have a finite number of columns and the isolation application 170 may discard the oldest column when generating a new column.

The current assignment matrix 334, symbolized as "$\tilde{M}$" specifies the assignments of the containers 190 to the logical processors 212 in the associated NUMA multiprocessor instance 110. Prior to receiving the first container initiation event, the isolation application 170 sets the current assignment matrix 334 equal to NULL, corresponding to the container count 332 of 0. Subsequently, upon receiving a new container initiation event, the isolation application 170 adds a new column of zeros corresponding to the new container 190 to the current assignment matrix 334. In a complementary fashion, upon receiving a new container termination event, the isolation application 170 removes the column corresponding to the container 190 associated with the container termination event from the current assignment matrix 334.

As shown, a request dataset 372 includes, without limitation, the container count 332, the request vector 330, the container metadata vector 338, the processor usage matrix 336, and the current assignment matrix 334. As depicted with a bubble numbered 2, after updating the request dataset 370 based on the reassignment event 324, the isolation application 170 transmits an assignment request 370 specifying the associated request dataset 370 to the predictive assignment application 160.

As depicted with a bubble numbered 3 and as described previously herein in conjunction with FIG. 1, the predictive assignment application 160 configures the feature extractor 136 to generate a feature set 350(y) for each of the containers 190(y) included in the request vector 330. For the container 190(y), the predictive assignment application 160 configures the feature extractor 136 to generate the feature set 350(y) based on the $y^{th}$ entry in the container metadata vector 338, the processor usage time series associated with the container 190(y), and a prediction time equal to the current time.

The features set 350(y) includes, without limitation, any number of contextual features 354 and any number of time series features 352. Each of the contextual features 354 is associated with the container 190(y) and is derived from the associated container metadata included in the container metadata vector 338. Examples of contextual features 354 include, without limitation, a user identifier indicating the user that launched the container 190(y), a Boolean indicating whether Java is installed in the container 190(y), the resources requested when the container 190(y) was launched (e.g., number of logical processors, amount of network resources, amount of the memory 116, amount of disk, etc.), an application name, etc.

By contrast, each of the temporal features is associated with the past processor usage of the container 190(y) or a time-related attribute of the container 190(y). Examples of time-series features include, without limitation, the average processor usage in the last minute, the median processor usage from (the prediction time—20 minutes) to the prediction time, the median processor usage from (the prediction time—10 minutes) to the prediction time, current hour of the day, current day of the week, etc.

As depicted with a bubble numbered 4, the predictive assignment application 160 configures the processor usage model 350 to generate a forecasted processor usage vector 360 based on the feature sets 350 (depicted with a bubble numbered 5). More precisely, the predictive assignment application 160 transmits each of the feature sets 350 to the processor usage model 150 as a different input initiating a different execution of the processor usage model 150. Accordingly, for each of the containers 190(y) specified in the request vector 330, the processor usage model 150 generates a forecasted processor usage 362(y) based on the feature set 350(y).

The forecasted processor usage vector 360 includes, without limitation, the forecasted processor usage 362(1)-362(K). As described previously in conjunction with FIG. 1, the forecasted processor usage 362(y) is the predicted P95 processor usage of the container 190(y) in the ten minutes following the prediction time (i.e., the current time). In alternate embodiments, the processor usage model 150 may compute any type of forecasted processor usage 362 in any technically feasible fashion. For instance, in some embodiments, the forecasted processor usage 362(y) may be a prediction of the average processor usage of the container 190(y) in the next hour.

As depicted with a bubble numbered 6, the predictive assignment application 160 configures the integer programming engine 162 to generate the binary assignment matrix 382 based on the forecasted processor usage vector 360, the request vector 330, the container count 332, the current assignment matrix 334, and an instance configuration 342. The instance configuration 342 includes, without limitation, a socket count, a logical processor count, and a core count. The socket count, the logical processor count, and the core count specify, respectively, the number of the sockets 220, the number of the logical processors 212, and the number of the cores 230 included in the NUMA microprocessor instance 110.

The predictive assignment application 160 may acquire the instance configuration 342 in addition to any other relevant information associated with the NUMA microprocessor instance 110 in any technically feasible fashion. For instance, in some embodiments, the predictive assignment application 160 receives the instance configuration 342 from the isolation application 170 or via an application programming interface ("API").

As described in greater detail in conjunction with FIGS. 4-5, the integer programming engine 162 executes one or more integer programming algorithms to optimize the binary assignment matrix 382 based on a cost function that estimates a performance cost associated with cache interference. Importantly, the cost function includes, without limitation, a term associated with a goal of balancing the predicted pressures across the LLCs 240 and a term associated with a goal of balancing the predicted pressures across the L1 caches 232 and the L2 caches 234 based on the forecasted processor usage vector 360.

As depicted with a bubble numbered 7, the predictive assignment application 160 transmits the binary assignment matrix 382 to the isolation application 170 as a new current assignment matrix 334. Subsequently and as depicted with a bubble numbered 8, the scheduler configuration engine 390 generates the processor assignment specification 172 based on the current assignment matrix 334. The scheduler configuration engine 380 then transmits the processor assignment specification 172 to the process scheduler 180.

In general, the processor assignment specification 172 configures the process scheduler 180 to assign the containers 190 to the logical processors 212 as per the assignments specified in the current assignment matrix 334. The scheduler configuration engine 390 may generate any type of processor assignment specification 172, at any level of granularity, and in any technically feasible fashion that is consistent with the process scheduler 180 executing on the NUMA microprocessor instance 110.

For instance, in some embodiments, the processor assignment specification 172 includes any number and type of processor affinity commands that bind a process (e.g., the container 190) or a thread to a specific processor (e.g., the logical processor 212) or a range of processors. In Linux, for example, each container 190 may be defined as an individual cgroup and the processor assignment specification 172 could include any number of "cpuset" commands, where each cpuset commands specifies the logical processors 112 that a particular cgroup is to execute on.

The isolation application 170 generates a new processor assignment specification 172 whenever the isolation application 170 acquires a new reassignment event 324. However, as described in greater detail in conjunction with FIG. 5, one of the terms in the cost function penalizes migrating containers 190 from one logical processor 212 to another logical processor 212, thereby discouraging the isolation application 170 from modifying processor assignments for currently executing containers 190.

Note that the techniques described herein are illustrative rather than restrictive, and may be altered without departing from the broader spirit and scope of the invention. Many modifications and variations will be apparent to those of ordinary skill in the art without departing from the scope and spirit of the described embodiments and techniques. As a general matter, the techniques outlined herein are applicable to assigning any type of workload to any type of processor based on a function associated with accessing shared caches in a NUMA architecture and forecasted processor usages.

FIG. 4 is a more detailed illustration of the integer programming engine 162 of FIG. 3, according to various embodiments of the present invention. For explanatory purposes only, the predictive assignment application 160 executes the integer programming engine 162 in response to receiving the assignment request 370 and the associated request dataset 372 from the isolation application 170 executing on the NUMA microprocessor instance 110 of FIG. 2.

As shown, the integer programming engine 162 generates the binary assignment matrix 382 based on the forecasted processor usage vector 360, the request vector 330, the container count 332, the current assignment matrix 334, and the instance configuration 342. The binary assignment matrix 382 is symbolized as "M", the forecasted processor usage vector 360 is symbolized as "p", the request vector 330 is symbolized as "r", the container count 332 is symbolized as "k", and the current assignment matrix 334 is symbolized as "M̃".

The instance configuration 342 includes, without limitation, a socket count 412, a logical processor count 414, and a core count 416. The socket count 412 specifies the number of the sockets 220 included in the NUMA microprocessor instance 110. The logical processor count 414 specifies the number of the logical processors 212 included in the NUMA microprocessor instance 110. The core count 416 specifies the number of the cores 230 included in the NUMA microprocessor instance 110. With reference to FIG. 2, the socket count 412 is N, the logical processor count 414 is the product of N and P, and the core count 416 is half of the logical processor count 414. As depicted in FIG. 4, the socket count 412 is symbolized as a constant "n", the logical processor count 414 is symbolized as a constant "d", and the core count 416 is symbolized as a constant "c".

The binary assignment matrix 382 is symbolized as "M" and specifies the assignments of the containers 190 to the logical processors 212. The $i^{th}$ row of the binary assignment matrix 382 represents the logical processor 212($i$) and the $i^{th}$ column of the binary assignment matrix 382 represents the container 190($j$). If the container 190($j$) is assigned to the logical processor 112(i), then the element $M_{i,j}$ included in the binary assignment matrix 382 is 1. Otherwise, the element $M_{i,j}$ included in the binary assignment matrix 382 is 0.

The dimensions of the binary assignment matrix 382 are d (the logical processor count 414) rows by k (the container count 332) columns, and each element included in the binary assignment matrix 382 is either zero or one. Consequently, $M \in \{0, 1\}^{d \times k}$. Note that, as previously described herein, the term "assignment" is symmetrical. If $M_{i,j}$ is equal to one, then the container 190(j) is assigned to the logical processor 212(i), and the logical processor 212(i) is assigned to the container 190(j). Importantly, each of the logical processors 212 is assigned to at most one of the containers 190, while each of the containers 190 can be assigned to multiple logical processors 212, and each logical processor 112 can execute a different thread.

The integer programming engine 162 implements an overall goal 440 via a cost function 442, an optimization criterion 444, constraints 446(1) and 446(2), and the current assignment matrix 334. The overall goal 440 is to optimize the binary assignment matrix 382 with respect to the cost function 442 while meeting the requested processor counts 422 and assigning at most one of the containers 190 to each of the logical processors 212.

The cost function 442 is symbolized as "C(M)" and estimates a cost associated with cache interference for the binary assignment matrix 382. The cost function 442 is described in greater detail in conjunction with FIG. 3. The optimization criterion 444 specifies that the integer programming engine 162 is to search for the binary assignment matrix 382 that minimizes the cost function 442 under a set of constraints that includes, without limitation, the constraints 446. The optimization criterion 444 can be expressed as the following equation (2):

$$\min_M C(M) \qquad (2)$$

The constraint 446(1) specifies that, for each of the containers 190, a valid binary assignment matrix 382 provides the requested processor count specified in the request vector 330. The constraint 446(1) can be expressed as the following equation (3a):

$$M^T 1_d = r \qquad (3a)$$

As referred to herein, $1_l \in R^l$ is the constant vector of one values of dimension l.

The constraint 446(2) specifies that at most one container 190 can be assigned to each of the logical processors 212. The constraint 446(2) can be expressed as the following equation (3b):

$$M 1_k \le 1_d \qquad (3b)$$

In operation, to achieve the overall goal 440, the integer programming engine 162 implements any number and type of integer programming operations based on the cost function 442, the optimization criterion 444, the constraints 446(1) and 446(2), and the current assignment matrix 334. For instance, in some embodiments, the integer programming engine 162 implements versions of the cost function 442, the optimization criterion 444, and the constraints 446 that are amenable to solution using integer linear programming. The integer programming engine 162 executes a solver that implements any number and combination of integer linear programming techniques to efficiently optimize the binary assignment matrix 382. Examples of typical integer linear programming techniques include, without limitation, branch and bound, heuristics, cutting planes, linear programming ("LP") relaxation, etc.

Estimating Cache Interference Costs

FIG. 5 is a more detailed illustration of the cost function 442 of FIG. 4, according to various embodiments of the present invention. As described previously herein with conjunction with FIG. 4, the cost function 442 estimates the performance impact of cache interference, and the integer programming engine 162 performs optimization operations that minimize the cost function 442. More precisely, the cost function 442 estimates a value for a cost that is correlated with the performance impact of cache interference. As shown, the cost function 442 is a weighted sum of five different constituent costs: a NUMA cost 522, an LLC cost 532, an L1/2 cost 542, a hyper-thread cost 552, and a reshuffling cost 562. The cost function 442 can be expressed as the following equation (4):

$$C(M) = \alpha_{NU} C_{NU}(M) + \alpha_{LLC} C_{LLC}(M) + \alpha_{L1/2} C_{L1/2}(M) + \alpha_O C_O(M) + \alpha_R C_R(M) \qquad (4)$$

The weights $\alpha_{NU}$, $\alpha_{LLC}$, $\alpha_{L1/2}$, $\alpha_O$, and $\alpha_R$ are hyperparameters that encode the relative contribution of each of the constituent costs to the overall performance impact associated with cache interference. Consequently, the weights reflect the relative importance of different goals associated with the constituent costs. In an order of highest importance to lowest importance, the constituent goals are a NUMA goal 520, an LLC goal 530, an L1/2 goal 540, a hyper-thread goal 550, and a reshuffling goal 560. Notably, the weights are associated with the latency costs of the various levels of the cache hierarchy, cross-socket NUMA accesses, and migration costs associated with reassigning threads. In some embodiments, the weights may be varied to reflect the characteristics of different NUMA microprocessor instances 110.

To render equation (4) amenable to solution via integer programming techniques, each of the constituent costs may be linearized as described below, resulting in a linearized form of the cost function 442 that can be expressed as the following equation (5):

$$C(M, X, Y, Z, V, U) = \alpha_{NU} C_{NU}(X) + \alpha_{LLC} C_{LLC}(Y, U) + \alpha_{L1/2} C_{L1/2}(Z) + \alpha_O C_O(M) + \alpha_R C_R(V) \qquad (5)$$

To facilitate the description of the constituent costs, a symbol "b" specifies the number of the logical processors 212 included in each of the sockets 220, is equal to the logical processor count 414(d) divided by the socket count 412(n), and is assumed to be constant across the sockets 220. Further, as depicted in FIG. 2, where b=P, indexing of the logical processor 212 corresponds to the parenthetical numbering and the following convention:

The logical processor 212(1) is the first logical processor 212 included in the core 230(1) of the socket 220(1)

The logical processor 212(2) is the second logical processor 212 included in the core 230(1) of the socket 220(1)

The logical processor 212(3) is the first logical processor 212 included in the core 230(2) of the socket 220(1)

. . .

The logical processor 212(b) is the second logical processor 212 included in the last core 230(c) of the socket 220(1)

The logical processor 212(b+1) is the first logical processor 212 included in the first core 230(c+1) of the socket 220(2)

...

The NUMA goal 520 and the NUMA cost 522 are defined based on a hypothesis that assigning a workload to a set of the logical processors 212 included in a single socket 220 instead of assigning the workload to a set of the logical processors 212 spread across multiple sockets 220 typically reduces cross-socket memory accesses. Accordingly, the NUMA goal 520 is to minimize cross-socket memory accesses. In a complementary fashion, the NUMA cost 522 reflects the cross-socket memory access cost of executing the container 190 on a set of the logical processors 212 that spans multiple sockets 220. Quantitatively, the NUMA cost 522 can be expressed as the following equations (6a) and (6b):

$$C_{NU}(M) = \sum_{j=1}^{k}\sum_{t=1}^{n} -\min(r_j, w_{t,j}) \tag{6a}$$

$$w_{t,j} = \sum_{i=(t-1)b+1}^{tb+1} m_{i,j} \quad w_{t,j} \in N^{N \times k} \tag{6b}$$

As referred to herein, $w_{t,j}$ is the number of the logical processors 212 included in the socket 220(t) that are assigned to the container 190(j). As persons skilled in the art will recognize, if any of the logical processors 212 assigned to the container 190(j) are not included in the socket 220(t), then $\min(r_j - r_j, w_{t,j})$ is equal to 1. Otherwise, $\min(r_j - \min(r_j, w_{t,j}), 1)$ is equal to 0. In this fashion, the NUMA cost 522 is related to the number of the containers 190 that span multiple sockets 220, and minimizing the NUMA cost 522 achieves the NUMA goal 520.

Linearizing the min function to re-parameterize equation (6a) results in the following equations (7a) and (7b) (introducing extra integer variables $x_{t,j}$) for the NUMA cost 522:

$$C_{NU}(X) = -\sum_{j=1}^{k}\sum_{t=1}^{n} x_{t,j} \tag{7a}$$

$$x_{t,j} \leq \frac{1}{r_j} \sum_{i=(t-1)b+1}^{tb+1} m_{i,j} \quad x_{t,j} \leq 1 \quad x_{t,j} \in N^{N \times k} \tag{7b}$$

The LLC goal 530 and the LLC cost 532 are defined based on a hypothesis that balancing the total forecasted processor usage 362 across the sockets 220 evens out the pressure on the LLCs 240 and typically avoids/reduces LCC trashing. As referred to herein, LCC trashing is the eviction of useful data from the LLCs 240. Accordingly, the LLC goal 530 is to balance the total forecasted processor usage 362 across the sockets 220. In a complementary fashion, the LLC cost 532 reflects the cost of uneven pressure on the LLCs 240. To encode the LLC goal 530 in a manner that is amenable to solution via integer programming techniques, the average forecasted processor usage 362 per socket 220 is introduced as the extra variable U. After further introducing extra integer variables $y_t$, the LLC cost 532 can be expressed as the following linearized equations (8a) and (8b):

$$C_{LLC}(Y, U) = \sum_{t=1}^{k} y_t \tag{8a}$$

$$y_t = \left| U - \sum_{i=(t-1)b+1}^{tb+1} p_j m_{i,j} \right| \quad y_t \in \mathbb{N}^n \tag{8b}$$

The L1/2 goal 540 and the L1/2 cost 542 are defined based on a hypothesis that balancing the total forecasted processor usage 362 across the cores 230 evens out the pressure on the LLCs 240 and typically avoids/reduces L1/2 trashing. As referred to herein, L1/2 trashing is the eviction of useful data from the L1 caches 232 and/or the L2 caches 234.

The number of the containers 190 that are assigned to the core 230(l) is equal to the sum of the two rows of the binary assignment matrix (M) 382 associated with the core 230(l). As described in greater detail previously herein in conjunction with FIG. 2, the two rows of the binary assignment matrix 382 associated with the core 230(l) are the row (2l) associated with the logical processor 212(2l) and the row (2l+1) associated with the logical processor (2l+1). As a general matter, the number of the containers 190 that are assigned to the core 230(l) is either zero, one, or two, and the total forecasted processor usage 362 for the core 230(l) can be computed using the following summation (9):

$$\sum_{j=1}^{k} p_j m_{2l,j} + \sum_{j=1}^{k} p_j m_{2l+1,j} \tag{9}$$

If the number of the containers 190 that are assigned to the core 230(l) is two, then two threads are executing on the core 230(l), sharing both the L1 cache 232(l) and the L2 cache 234(l). Accordingly, the L1/2 cost 542 can be expressed as the following equation (10):

$$C_{L1/2}(M) = \sum_{l=1}^{c} \max\left(0, -1 + \sum_{j=1}^{k} p_j m_{2l,j} + \sum_{j=1}^{k} p_j m_{2l+1,j}\right) \tag{10}$$

Linearizing the max function to re-parameterize equation (10) results in the following equations (11a) and (11b) (introducing extra integer variables $z_l$) for the L1/2 cost 542:

$$C_{L1/2}(Z) = \sum_{l=0}^{c-1} z_l \tag{11a}$$

$$z_l \geq -1 + \sum_{-1}^{k} p_j m_{2l+1,j} + \sum_{j=1}^{k} p_j m_{2l+2,j} \quad z_l \geq 0 \quad z_l \in \mathbb{N}^c \tag{11b}$$

The hyper-thread goal 550 and the hyper-thread cost 552 are defined based on a hypothesis that when two hyper-threads of the same core 230 are required to co-exist, associating the hyper-threads with the same workload typically reduces cache interference. More precisely, to reduce cache interference, assigning the same container 190 to the two logical processors 212 included in the core 230(x) is preferable to assigning different containers 190 to the two logical processors 212 included in the core 230(x). Accordingly, the hyper-thread goal 550 is to maximize hyper-thread affinity.

To encode the hyper-thread goal 550 in a manner that is amenable to solution via integer programming techniques, the elements of a matrix H are defined based on the following equation (12):

$$h_{i,j} = i \times j \times \left\lceil \frac{i}{b} \right\rceil \quad \lceil x \rceil = \text{ceil}(x) \quad H \in \mathbb{N}^{d \times k} \tag{12}$$

Penalizing scheduling in which assigned logical processors 212 are not contiguous and preferring scheduling of the logical processors 212 and the sockets 220 having low indices results in the following equation (13) for the hyper-thread cost 552:

$$C_O(M) = \sum_{i=1}^{d} \sum_{j=1}^{k} h_{i,j} m_{i,j} \tag{13}$$

Notably, equation (13) is linear in M. As persons skilled in the art will recognize, when both of the logical processors 212 in a given core 230(x) are used, the combination of the hyper-thread cost 552 and the L1/2 cost 542 predisposes the integer programming engine 162 to assign the same container 190 to both of the logical processors 212. Further, the hyper-thread cost 552 predisposes the integer programming engine 162 to generate visually "organized" processor assignments, in which assigned indices are often contiguous.

The reshuffling goal 560 and the reshuffling cost 562 are defined based on a hypothesis that when a new workload is initiated or an existing task workload, retaining the processor assignments of currently executing workloads is preferable to reassigning the workloads. Accordingly, the reshuffling goal 560 is to minimize the reshuffling of the containers 190 between the logical processors 212, and the reshuffling cost 562 penalizes processor assignments that deviate from the current assignment matrix 382. The reshuffling cost 562 can be expressed as the following equation (14):

$$C_R(M) = \sum_{i=1}^{d} \sum_{j=1}^{k} |m_{i,j} - \tilde{m}_{i,j}| \tag{14}$$

As described previously in conjunction with FIG. 2, M symbolizes the current assignment matrix 334. The current assignment matrix 334 is the previous binary assignment matrix 382 augmented with a final column for a new container 190 or modified with a column filled with zeros for a terminated container 190.

Linearizing the equation (14) results in the following equations (15a) and (15b) (introducing extra integer variables $v_{i,j}$) for the reshuffling cost 562:

$$C_R(V) = \sum_{i=1}^{d} \sum_{j=1}^{k} v_{i,j} \tag{15a}$$

$$m_{i,j} - \tilde{m}_{i,j} \leq v_{i,j}$$
$$-m_{i,j} + \tilde{m}_{i,j} \leq v_{i,j} \tag{15b}$$
$$v_{i,j} \in \mathbb{Z}^{d \times k}$$

As persons skilled in the art will recognize, the equations (4)-(15b) are examples of mathematical ways to express the overall goal 440, the NUMA goal 520, the LLC goal 530, the L1/2 goal 540, the hyper-thread goal 550, and the reshuffling goal 560. In alternate embodiments, any number of the overall goal 440, the NUMA goal 520, the LLC goal 530, the L1/2 goal 540, the hyper-thread goal 550, and the reshuffling goal 560 may be expressed in different mathematical ways.

Figure 6:
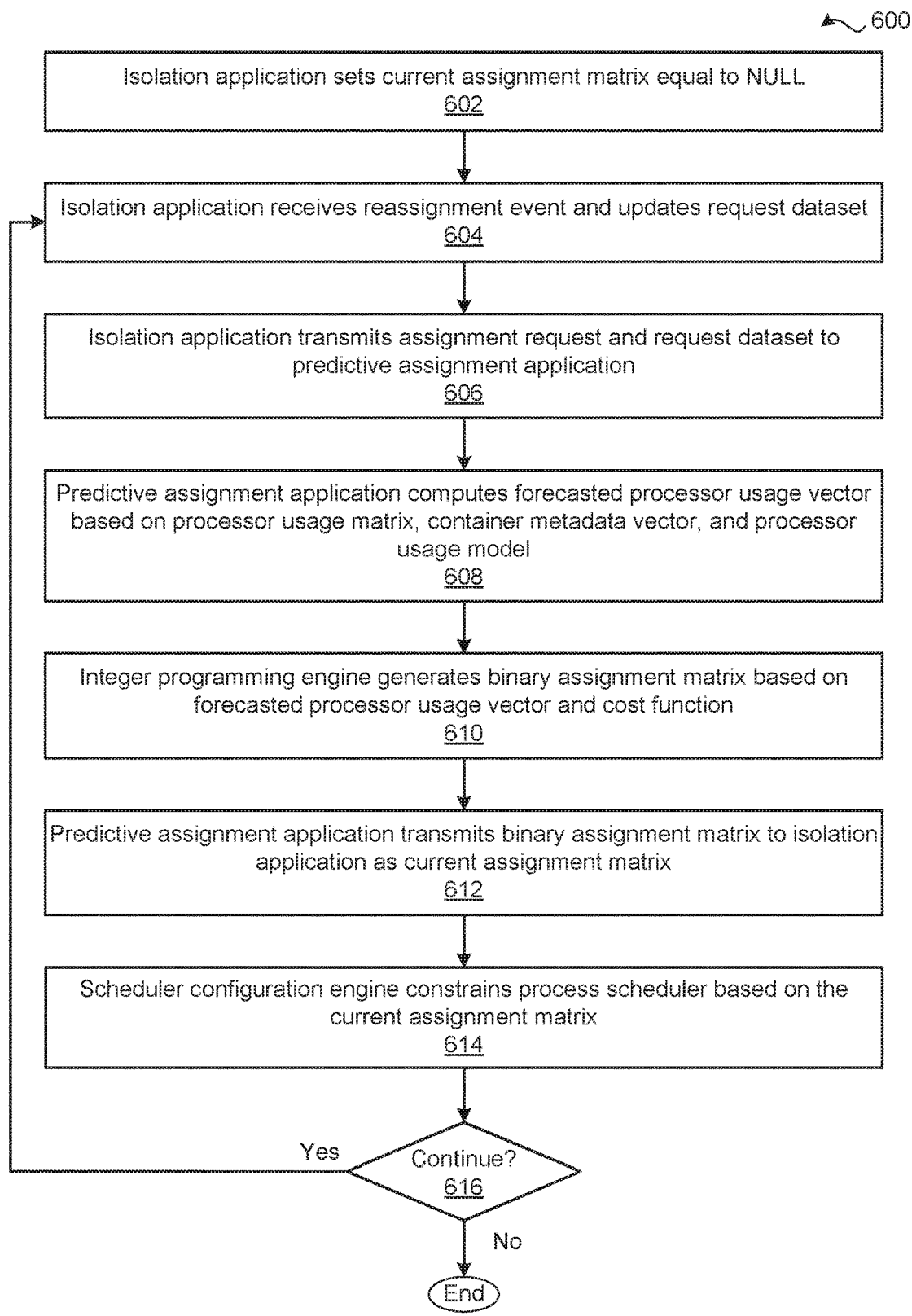
FIG. 6 is a flow diagram of method steps for executing workloads on processors that share at least one cache, according to various embodiments of the present invention.

FIG. 6 is a flow diagram of method steps for executing workloads on processors that share at least one cache, according to various embodiments of the present invention. Although the method steps are described with reference to the systems of FIGS. 1-5, persons skilled in the art will understand that any system configured to implement the method steps, in any order, falls within the scope of the present invention. In particular, although the method steps are described in the context of the containers 190, the containers 190 may be replaced with any type of workload in alternate embodiments.

As shown, a method 600 begins at step 602, where the isolation application 170 sets the current assignment matrix 334 equal to NULL to indicate that no containers 190 are currently executing on the NUMA microprocessor instance 110. At step 604, the isolation application 170 receives a reassignment event 324 and updates the request set 372 to reflect current processor usages and any changes to the containers 190 associated with the NUMA microprocessor instance 110. At step 606, the isolation application 170 transmits the assignment request 370 and the associated request set 372 to the predictive assignment application 160.

At step 608, the predictive assignment application 160 computes the forecasted processor usage vector 360 based on the processor usage matrix 336, the container metadata vector 338, and the processor usage model 150. As described previously in conjunction with FIG. 2, the forecasted processor usage vector 360 includes the forecasted processor usage 362 for each of the containers 190 associated with the NUMA microprocessor instances 110.

At step 610, the integer programming engine 162 generates the binary assignment matrix 382 based on the forecasted processor usage vector 360 and the cost function 442. At step 612, the predictive assignment application 160 transmits the binary assignment matrix 382 to the isolation application 170 as the current assignment matrix 334. At step 614, the scheduler configuration engine 390 constrains the process scheduler 180 based on the current assignment matrix 334. As a result, the default scheduling behavior of the process scheduler 180 is over-ruled, and the process scheduler 180 implements the processor assignments specified in current assignment matrix 334.

At step 616, the isolation application 170 determines whether to continue executing. The isolation application 170 may determine whether to continue executing in any technically feasible fashion and based on any type of data. For instance, in some embodiments, the isolation application 170 may determine to cease executing based on an exit command received via an application programming interface ("API").

If, at step 616, the isolation application 170 determines to continue executing, then the method 600 returns to step 604, where the isolation application 170 receives a new reassignment event 324. The isolation application 170 and the predictive assignment application 160 continue to cycle through steps 604-616, regenerating the current assignment matrix 334 in response to new reassignment events 324, until the isolation application 170 determines to cease executing. If, however, at step 616, the isolation application 170 determines to cease executing, then the method 600 terminates.

In sum, the disclosed techniques may be used to efficiently execute workloads tasks, processes, threads, containers, etc.) on processors implemented in NUMA architectures. In one embodiment, a system includes a training database, a training application, a predictive assignment application, and any number of NUMA microprocessor instances each of which executes a different instance of an isolation application. For each of any number of containers, the training database includes container metadata and a processor usage time series. The training application performs machine learning operations using contextual features and time series features derived from the training database to generate a processor usage model that computes forecasted processor usages for containers.

Each of the isolation applications tracks the processor usage of the containers executing on the associated NUMA microprocessor instance and asynchronously executes a processor assignment process in response to reassignment events (e.g., a container initiation event, a container termination event, or a re-balancing event). To initiate a processor assignment process, the isolation application transmits an assignment request and an associated request dataset to the predictive assignment application. For each container associated with the NUMA microprocessor instance, the request dataset includes container metadata and a processor usage time series.

For each container associated with the assignment request, the predictive assignment application computes a forecasted processor usage based on the associated container metadata, the associated processor usage time series, and the processor usage model. Subsequently, an integer programming engine included in the predictive assignment application generates a current assignment matrix that minimizes a cost function based on the forecasted processor usages. The cost function includes terms that relate to a priori processor assignment goals. In particular, the cost function includes terms that relate to balancing the predicted pressures across the LLCs and across the L1 and L2 caches. The current assignment matrix specifies a set of processor assignments that assigns each of the containers to the associated requested processor count of logical processors. The isolation application then configures a processor scheduler to implement the set of processor assignments.

At least one technical advantage of the disclosed techniques relative to the prior art is that the predictive assignment application can automatically and more reliably reduce cache interference associated with co-located threads (i.e., threads sharing at least one cache) in a NUMA microprocessor instance. In particular, balancing the predicted pressures across the LLCs and across the L1 and L2 caches based on forecasted processor use can reduce cache interference in NUMA processor instances in a more systematic, data-driven fashion. Reducing cache interference improves the latency and/or throughput of the logical processors and, consequently, the time required for workloads to execute in NUMA microprocessor instances can be substantially decreased. Further, the variances in both latency and throughput are decreased, thereby increasing execution predictability and decreasing preemptive over-provisioning. These technical advantages represent one or more technological advancements over prior art approaches.

1. In some embodiments, a computer-implemented method for executing workloads on processors comprises computing a forecasted amount of processor use for each workload included in a first plurality of workloads using a trained machine-learning model; based on the forecasted amounts of processor use, computing a performance cost estimate associated with an estimated level of cache interference arising from executing the first plurality of workloads on a first plurality of processors; and determining at least one processor assignment based on the performance cost estimate, wherein at least one processor included in the first plurality of processors is subsequently configured to execute at least a portion of a first workload included in the first plurality of workloads based on the at least one processor assignment.

2. The computer-implemented method of clause 1, wherein the first workload comprises a container, an execution thread, or a task.

3. The computer-implemented method of clauses 1 or 2, wherein the first plurality of processors are included in a non-uniform memory access multiprocessor instance.

4. The computer-implemented method of any of clauses 1-3, wherein computing the forecasted amount of processor use for the first workload comprises computing at least one time-series feature based on a measured amount of processor use associated with executing the first workload on the first plurality of processors; computing at least one contextual feature based on metadata associated with the first workload; and inputting the at least one time-series feature and the at least one contextual feature into the trained machine-learning model.

5. The computer-implemented method of any of clauses 1-4, wherein determining the at least one processor assignment comprises executing one or more integer programming operations based on a first binary assignment matrix to generate a second binary assignment matrix that specifies the at least one processor assignment.

6. The computer-implemented method of any of clauses 1-5, wherein the first plurality of processors are partitioned into at least a first subset of processors that share a first lowest-level cache (LLC) and a second subset of processors that share a second LLC, and wherein computing the performance cost estimate comprises estimating a cache interference cost based on an imbalance in predicted pressures between the first LLC and the second LLC.

7. The computer-implemented method of any of clauses 1-6, wherein each processor included in the first plurality of processors is associated with a different set of one or more cache memories, and wherein computing the performance cost estimate comprises estimating a cache interference cost based on an imbalance in predicted pressures across the sets of one or more cache memories.

8. The computer-implemented method of any of clauses 1-7, wherein computing the performance cost estimate comprises estimating a cache sharing cost resulting from sharing at least one of a level one cache memory and a level two cache memory between a first execution thread associated with the first workload and a second execution thread associated with a second workload included in the first plurality of workloads.

9. The computer-implemented method of any of clauses 1-8, further comprising for each workload included in a second plurality of workloads, acquiring a set of attributes associated with the workload and a measured amount of processor use associated with executing at least a portion of the workload on at least one processor included in a second plurality of processors; and executing one or more machine-learning algorithms to generate the trained machine-learning model based on the measured amounts of processor use and the sets of attributes.

10. The computer-implemented method of any of clauses 1-9, wherein the trained machine-learning model comprises a conditional regression model.

11. In some embodiments, one or more non-transitory computer readable media include instructions that, when executed by one or more processors, cause the one or more processors to execute workloads on processors by performing the steps of for each workload included in a plurality of workloads, inputting at least one feature associated with the workload into a trained machine-learning model to compute a forecasted amount of processor use associated with the workload; based on the forecasted amounts of processor use, computing a performance cost estimate associated with an estimated level of cache interference arising from executing the plurality of workloads on a plurality of processors; and determining a first plurality of processor assignments based on the performance cost estimate, wherein at least one processor included in the plurality of processors is subsequently configured to execute at least a portion of a first workload included in the plurality of workloads based on at least one processor assignment included in the first plurality of processor assignments.

12. The one or more non-transitory computer readable media of clause 11, further comprising computing the at least one feature associated with the first workload based on a measured amount of processor use associated with executing the first workload on the plurality of processors.

13. The one or more non-transitory computer readable media of clauses 11 or 12, further comprising computing the at least one feature associated with the first workload based on at least one of a number of requested processors associated with the first workload, an amount of requested memory associated with the first workload, a name of a software application associated with the first workload, and a user identifier associated with the first workload.

14. The one or more non-transitory computer readable media of any of clauses 11-13, wherein determining the first plurality of processor assignments comprises executing one or more optimization operations based on a first binary assignment matrix that specifies a second plurality of processor assignments to generate a second binary assignment matrix that specifies the first plurality of processor assignments.

15. The one or more non-transitory computer readable media of any of clauses 11-14, wherein the plurality of processors are partitioned into at least a first subset of processors that share a first lowest-level cache (LLC) and a second subset of processors that share a second LLC, and wherein computing the performance cost estimate comprises estimating a cache interference cost based on an imbalance in predicted pressures between the first LLC and the second LLC.

16. The one or more non-transitory computer readable media of any of clauses 11-15, wherein each processor included in the plurality of processors is associated with a different set of one or more cache memories, and wherein computing the performance cost estimate comprises estimating a cache interference cost based on an imbalance in predicted pressures across the sets of one or more cache memories.

17. The one or more non-transitory computer readable media of any of clauses 11-16, wherein the plurality of processors are partitioned into at least a first subset of processors that are included in a first socket and a second subset of processors that are included in a second socket, and wherein computing the performance cost estimate comprises estimating a cross-socket memory access cost resulting from executing a first execution thread associated with the first workload on a first processor included in the first subset of processors while also executing a second execution thread associated with the first workload on a second processor included in the second subset of processors.

18. The one or more non-transitory computer readable media of any of clauses 11-17, wherein computing the performance cost estimate comprises estimating a performance cost resulting from executing a first thread associated with the first workload on a first processor included in the plurality of processors and subsequently executing a second thread associated with a second workload included in the plurality of workloads on the first processor.

19. The one or more non-transitory computer readable media of any of clauses 11-18, wherein the forecasted amounts of processor use comprise predicted amounts of processor use associated with a statistical level of confidence.

20. In some embodiments, a system for generating executing workloads on processors comprises one or more memories storing instructions; and one or more processors that are coupled to the one or more memories and, when executing the instructions, are configured to compute a forecasted amount of processor use for each workload included in a plurality of workloads using a trained machine-learning model; based on the forecasted amounts of processor use, compute a performance cost estimate associated with an estimated level of cache interference arising from executing the plurality of workloads on a plurality of processors; and perform one or more optimization operations on a first plurality of processors assignments based on the performance cost estimate to generate a second plurality of processor assignments, wherein at least one processor included in the plurality of processors is subsequently configured to execute at least a portion of a first workload included in the plurality of workloads based on at least one processor assignment included in the second plurality of processor assignments.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for executing workloads on processors, the method comprising:
computing a forecasted amount of processor use for each workload included in a first plurality of workloads using a trained machine-learning model;
based on the forecasted amounts of processor use, computing a numeric performance cost estimate associated with an estimated level of cache interference arising from executing the first plurality of workloads on a first plurality of processors, wherein the numeric performance cost estimate is computed based on (i) a first term for balancing the forecasted amounts of processor use across a plurality of lowest-level caches (LLCs) shared by the first plurality of processors and (ii) a second term for balancing the forecasted amounts of processor use across a plurality of additional caches shared by the first plurality of processors, and wherein the plurality of additional caches are at one or more cache levels that are higher than a cache level associated with the plurality of LLCs; and
determining at least one processor assignment based on the numeric performance cost estimate,
wherein at least one processor included in the first plurality of processors is subsequently configured to execute at least a portion of a first workload included in the first plurality of workloads based on the at least one processor assignment.

2. The computer-implemented method of claim 1, wherein the first workload comprises a container, an execution thread, or a task.

3. The computer-implemented method of claim 1, wherein the first plurality of processors are included in a non-uniform memory access multiprocessor instance.

4. The computer-implemented method of claim 1, wherein computing the forecasted amount of processor use for the first workload comprises:
computing at least one time-series feature based on a measured amount of processor use associated with executing the first workload on the first plurality of processors;
computing at least one contextual feature based on metadata associated with the first workload; and
inputting the at least one time-series feature and the at least one contextual feature into the trained machine-learning model.

5. The computer-implemented method of claim 1, wherein determining the at least one processor assignment comprises executing one or more integer programming operations based on a first binary assignment matrix to generate a second binary assignment matrix that specifies the at least one processor assignment.

6. The computer-implemented method of claim 1, wherein the first plurality of processors are partitioned into at least a first subset of processors that share a first lowest-level cache (LLC) and a second subset of processors that share a second LLC, and wherein computing the numeric performance cost estimate comprises estimating a cache interference cost based on an imbalance in predicted pressures between the first LLC and the second LLC.

7. The computer-implemented method of claim 1, wherein computing the numeric performance cost estimate comprises estimating a cache sharing cost resulting from sharing at least one of a level one cache memory and a level two cache memory between a first execution thread associated with the first workload and a second execution thread associated with a second workload included in the first plurality of workloads.

8. The computer-implemented method of claim 1, further comprising:
for each workload included in a second plurality of workloads, acquiring a set of attributes associated with the workload and a measured amount of processor use associated with executing at least a portion of the workload on at least one processor included in a second plurality of processors; and executing one or more machine-learning algorithms to generate the trained machine-learning model based on the measured amounts of processor use and the sets of attributes.

9. The computer-implemented method of claim 1, wherein the trained machine-learning model comprises a conditional regression model.

10. One or more non-transitory computer readable media including instructions that, when executed by one or more processors, cause the one or more processors to execute workloads on processors by performing the steps of:

for each workload included in a plurality of workloads, inputting at least one feature associated with the workload into a trained machine-learning model to compute a forecasted amount of processor use associated with the workload;

based on the forecasted amounts of processor use, computing a numeric performance cost estimate associated with an estimated level of cache interference arising from executing the plurality of workloads on a plurality of processors, wherein the numeric performance cost estimate is computed based on (i) a first term for balancing the forecasted amounts of processor use across a plurality of lowest-level caches (LLCs) shared by the first plurality of processors and (ii) a second term for balancing the forecasted amounts of processor use across a plurality of additional caches shared by the first plurality of processors, and wherein the plurality of additional caches are at one or more cache levels that are higher than a cache level associated with the plurality of LLCs; and determining a first plurality of processor assignments based on the numeric performance cost estimate, wherein at least one processor included in the plurality of processors is subsequently configured to execute at least a portion of a first workload included in the plurality of workloads based on at least one processor assignment included in the first plurality of processor assignments.

11. The one or more non-transitory computer readable media of claim 10, further comprising computing the at least one feature associated with the first workload based on a measured amount of processor use associated with executing the first workload on the plurality of processors.

12. The one or more non-transitory computer readable media of claim 10, further comprising computing the at least one feature associated with the first workload based on at least one of a number of requested processors associated with the first workload, an amount of requested memory associated with the first workload, a name of a software application associated with the first workload, and a user identifier associated with the first workload.

13. The one or more non-transitory computer readable media of claim 10, wherein determining the first plurality of processor assignments comprises executing one or more optimization operations based on a first binary assignment matrix that specifies a second plurality of processor assignments to generate a second binary assignment matrix that specifies the first plurality of processor assignments.

14. The one or more non-transitory computer readable media of claim 10, wherein the plurality of processors are partitioned into at least a first subset of processors that share a first lowest-level cache (LLC) and a second subset of processors that share a second LLC, and wherein computing the numeric performance cost estimate comprises estimating a cache interference cost based on an imbalance in predicted pressures between the first LLC and the second LLC.

15. The one or more non-transitory computer readable media of claim 10, wherein each processor included in the plurality of processors is associated with a different set of one or more cache memories, and wherein computing the numeric performance cost estimate comprises estimating a cache interference cost based on an imbalance in predicted pressures across the sets of one or more cache memories.

16. The one or more non-transitory computer readable media of claim 10, wherein the plurality of processors are partitioned into at least a first subset of processors that are included in a first socket and a second subset of processors that are included in a second socket, and wherein computing the numeric performance cost estimate comprises estimating a cross-socket memory access cost resulting from executing a first execution thread associated with the first workload on a first processor included in the first subset of processors while also executing a second execution thread associated with the first workload on a second processor included in the second subset of processors.

17. The one or more non-transitory computer readable media of claim 10, wherein computing the numeric performance cost estimate comprises estimating a performance cost resulting from executing a first thread associated with the first workload on a first processor included in the plurality of processors and subsequently executing a second thread associated with a second workload included in the plurality of workloads on the first processor.

18. The one or more non-transitory computer readable media of claim 10, wherein the forecasted amounts of processor use comprise predicted amounts of processor use associated with a statistical level of confidence.

19. A system for executing workloads on processors, the system comprising:

one or more memories storing instructions; and one or more processors that are coupled to the one or more memories and, when executing the instructions, are configured to:

compute a forecasted amount of processor use for each workload included in a plurality of workloads using a trained machine-learning model;

based on the forecasted amounts of processor use, compute a numeric performance cost estimate associated with an estimated level of cache interference arising from executing the plurality of workloads on a plurality of processors, wherein the numeric performance cost estimate is computed based on (i) a first term for balancing the forecasted amounts of processor use across a plurality of lowest-level caches (LLCs) shared by the first plurality of processors and (ii) a second term for balancing the forecasted amounts of processor use across a plurality of additional caches shared by the first plurality of processors, and wherein the plurality of additional caches are at one or more cache levels that are higher than a cache level associated with the plurality of LLCs; and perform one or more optimization operations on a first plurality of processors assignments based on the numeric performance cost estimate to generate a second plurality of processor assignments, wherein at least one processor included in the plurality of processors is subsequently configured to execute at least a portion of a first workload included in the plurality of workloads based on at least one processor assignment included in the second plurality of processor assignments.

\* \* \* \* \*